(12) United States Patent
Ausen et al.

(10) Patent No.: US 11,945,149 B2
(45) Date of Patent: Apr. 2, 2024

(54) COEXTRUDED ARTICLES, DIES AND METHODS OF MAKING THE SAME

(71) Applicant: 3M INNOVATIVE PROPERTIES COMPANY, St. Paul, MN (US)

(72) Inventors: Ronald W. Ausen, St. Paul, MN (US); William J. Kopecky, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 450 days.

(21) Appl. No.: 17/247,191

(22) PCT Filed: Jun. 19, 2019

(86) PCT No.: PCT/IB2019/055182
§ 371 (c)(1),
(2) Date: Dec. 3, 2020

(87) PCT Pub. No.: WO2020/003065
PCT Pub. Date: Jan. 2, 2020

(65) Prior Publication Data
US 2021/0323209 A1    Oct. 21, 2021

Related U.S. Application Data

(60) Provisional application No. 62/690,119, filed on Jun. 26, 2018.

(51) Int. Cl.
*B29C 48/11* (2019.01)
*B29C 48/21* (2019.01)
(Continued)

(52) U.S. Cl.
CPC .............. *B29C 48/11* (2019.02); *B29C 48/21* (2019.02); *B29C 48/307* (2019.02);
(Continued)

(58) Field of Classification Search
CPC . G02B 6/005; G02B 6/0096; B29L 2024/006; B29L 2031/60; B29D 99/0014;
(Continued)

(56) References Cited

U.S. PATENT DOCUMENTS 3,274,315 A    9/1966    Kawamura
3,372,920 A    3/1968    Corbett
(Continued)

FOREIGN PATENT DOCUMENTS

CA    2592720    12/2017
FR    2876624    4/2006
(Continued)

OTHER PUBLICATIONS

International Search report for PCT International Application No. PCT/IB2019/055182 dated Oct. 31, 2019, 5 pages.

*Primary Examiner* — Yan Lan
(74) *Attorney, Agent, or Firm* — Thomas M. Spielbauer; Lynn R. Hunsberger

(57) ABSTRACT

Coextruded articles comprising first and second layers each having first and second opposed major surfaces and between the first and second layers a series of first walls providing a series of microchannels, and methods for making the same. Embodiment of coextruded articles described herein are useful, for example, in cushioning applications where high levels of compression are desired.

10 Claims, 8 Drawing Sheets

(51) Int. Cl.
*B29C 48/305* (2019.01)
*B29C 48/345* (2019.01)
*B29C 71/02* (2006.01)

(52) U.S. Cl.
CPC ............ *B29C 48/345* (2019.02); *B29C 71/02* (2013.01); *B29C 2071/025* (2013.01)

(58) Field of Classification Search
CPC ..... B29C 48/0017; B29C 48/07; B29C 48/11; B29C 48/12; B29C 48/21; B29C 48/305; B29C 48/49; B29C 48/903; B29C 48/904; B29C 48/908; B29C 48/913; B29C 48/916
See application file for complete search history.

(56) References Cited

U.S. PATENT DOCUMENTS

| | | | |
|---|---|---|---|
| 3,935,357 | A | 1/1976 | Padovani |
| 4,136,220 | A | 1/1979 | Olabisi |
| 4,234,642 | A | 11/1980 | Olabisi |
| 4,381,912 | A | 5/1983 | Yamamoto |
| 4,707,393 | A | 11/1987 | Vetter |
| 5,427,316 | A | 6/1995 | Leone |
| 5,567,493 | A | 10/1996 | Imai |
| 6,666,138 | B2 | 12/2003 | Randazzo |
| 6,787,216 | B1 | 9/2004 | Koenhen |
| 8,641,946 | B2 | 2/2014 | Mackley |
| 2001/0042471 | A1 | 11/2001 | Randazzo |
| 2003/0215613 | A1 | 11/2003 | Jan |
| 2004/0170810 | A1 | 9/2004 | Rasmussen |
| 2005/0049566 | A1 | 3/2005 | Vukos |
| 2005/0255295 | A1 | 11/2005 | Lin |
| 2007/0236960 | A1 | 10/2007 | Anderson |
| 2008/0003870 | A1 | 1/2008 | Wu |
| 2011/0020574 | A1 | 1/2011 | Mackley |
| 2011/0217428 | A1 | 9/2011 | Vaman |
| 2014/0248471 | A1 | 9/2014 | Hanschen |

FOREIGN PATENT DOCUMENTS

| | | |
|---|---|---|
| GB | 2103144 | 2/1983 |
| JP | H1190192 | 4/1999 |
| WO | WO 2001-008866 | 2/2001 |
| WO | WO 2003-051782 | 6/2003 |
| WO | WO 2012-094315 | 7/2012 |
| WO | WO 2012-094317 | 7/2012 |
| WO | WO 2013-009538 | 1/2013 |
| WO | WO 2013-167542 | 11/2013 |
| WO | WO 2014-003761 | 1/2014 |
| WO | WO 2016-091761 | 6/2016 |
| WO | WO 2020-003066 | 1/2020 |

COEXTRUDED ARTICLES, DIES AND METHODS OF MAKING THE SAME

CROSS REFERENCE TO RELATED APPLICATIONS

This application is a national stage filing under 35 U.S.C. 371 of PCT/IB2019/055182, filed Jun. 19, 2019, which claims the benefit of U.S. Application No. 62/690,119, filed Jun. 26, 2018, the disclosure of which is incorporated by reference in its/their entirety herein.

BACKGROUND

Extrusion of channel profiles are well known in the art. Typically, single or two-piece dies are constructed to generate the channel profile (see, e.g., U.S. Pat. No. 3,274,315 (Kawamura). A typical extrusion die may have an outer manifold and an inner manifold. The inner manifold includes a port for allowing air to enter within the channel as the extrusion is formed, which prevents the collapse of the channel structure. Machining of these dies is limited to the precision at which die parts can be formed.

The extrusion of smaller channels to form film-like webs typically requires higher precision extrusion dies. This is because the flow rate of material is very dependent upon the resistance within the die. Small changes in the cavity size have significant effects on the resultant extruded part. Thus, uniformity of flow passageway resistance within the die is important for the formation of uniform channel webs.

Coextrusion of polymers is well known in the art. Polymer melt streams from two or more extruders are combined together to form articles with unique properties. Successful coextrusion is dependent upon polymer weld lines to hold together based on the needs of the article. The compatibility of coextruded polymers and the methods of welding the streams together are important considerations for the article construction.

Channel webs are useful for many applications such as spacer webs and cushioning materials. There is a need to create thin channel webs which are uniform in mechanical properties.

SUMMARY

In one aspect, the present disclosure describes a first coextruded article comprising first and second layers each having first and second opposed major surfaces and between the first and second layers a series of first walls providing a series of microchannels, wherein there are at least 5 (in some embodiments, at least 10, 15, 20, 25, 30, 35, or even up to 40) first walls per cm, wherein each wall has a height extending from the first layer to the second layer, wherein for each wall there is a first average width along the first 2 percent of the height of the wall, wherein for each wall there is a second average width along the last 2 percent of the height of the wall, wherein for each wall there is a third average width along the remaining 96 percent of the height of the wall, and wherein for at least 50 (in some embodiments, at least 60, 70, 75, 80, 90, 95, or even 100) percent by number of the walls, the first average widths are less than the third average widths.

In another aspect, the present disclosure describes a second coextruded article comprising first and second layers each having first and second opposed major surfaces and between the first and second layers a series of first walls providing a series of microchannels, wherein there are at least 5 (in some embodiments, at least 10, 15, 20, 25, 30, 35, or even up to 40) first walls per cm, wherein each wall has a height extending from the first layer to the second layer, wherein for each wall there is a first average width along the first 2 percent of the height of the wall, wherein for each wall there is a second average width along the last 2 percent of the height of the wall, wherein for each wall there is a third average width along the remaining 96 percent of the height of the wall, and wherein for at least 50 (in some embodiments, at least 60, 70, 75, 80, 90, 95, or even 100) percent by number of the walls, the first average widths are less than the third average widths, wherein there are demarcation lines between the walls and the first and second layers.

In another aspect, the present disclosure describes a third coextruded article comprising first and second layers each having first and second opposed major surfaces and between the first and second layers a series of first walls provide a series of microchannels, wherein there are at least 5 (in some embodiments, at least 10, 15, 20, 25, 30, 35, or even up to 40) first walls per cm, wherein each wall has a height extending from the first layer to the second layer, wherein each wall has an average width along its respective height, wherein no width of a wall exceeds more than ±20 (in some embodiments, not more than ±25, ±30, ±40, or even not more than ±50) percent of the average width for that wall, wherein there is an average width of the walls, and wherein no average width of a respective wall exceeds more than 5 (in some embodiments, not more than 10, 15, or even not more than 20) percent of the average width of the walls.

In another aspect, the present disclosure describes a method for making coextruded articles described herein, the method comprising:

providing an extrusion die comprising a first cavity, a second cavity, a third cavity, and a first die slot, a second die slot, and a plurality of third die slots, wherein each die slot has a distal opening, wherein there is a fluid passageway between the first cavity and the first die slot, a fluid passageway between the second cavity and a second die slot, and a plurality of fluid passageways between the third cavity and the plurality of third die slots;

providing via extrusion a first material to the first cavity of the extrusion die, a second material to the second cavity of the extrusion die, and a third material to the third cavity of the extrusion die;

extruding the layers from the distal opening of the die slots; and forming together the extrusion melt from first and second die slot with the plurality of extrudate from the third die slots into one continuous coextruded article; and quenching the extruded layer.

Embodiment of coextruded articles described herein are useful, for example, in cushioning applications where high levels of compression are desired. Conventional foamed sheets are typically limited in the amount of void space that can be generated, whereas embodiments of coextruded articles described herein can have relatively high void content (i.e., greater than 50%).

Embodiments of coextruded articles described herein are useful, for example, in applications using liquid or gas materials for heat transfer. For example, a coextruded article described herein can be placed in contact with components requiring temperature control, wherein the channels contain heat transfer media.

Embodiments of coextruded articles described herein may also be used as spacer webs. For example, coextruded articles described herein can provide significant spacing with a minimal amount of material usage. For example, coextruded articles which require beam strength with minimal weight can be created with rigid films separated by a coextruded article described herein.

DETAILED DESCRIPTION

Figure 1:
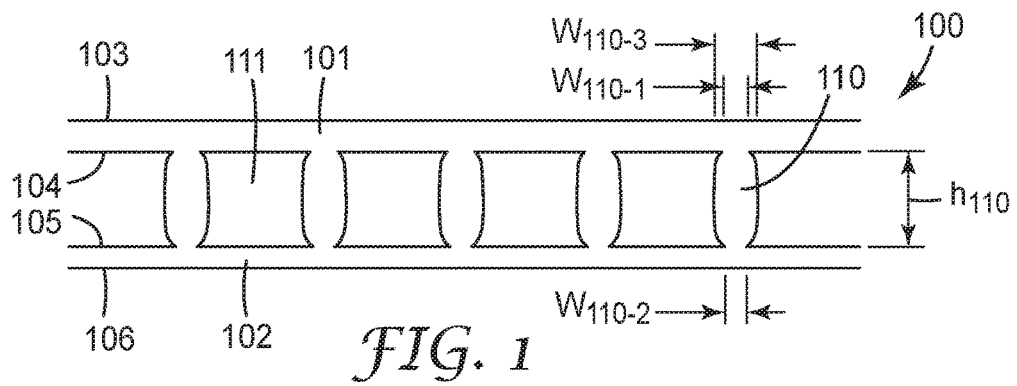
FIG. 1 is a schematic cross-sectional view of an exemplary first coextruded article described herein.

Referring to FIG. 1, exemplary first coextruded article described herein 100 comprises first and second layers 101, 102 each having first and second opposed major surfaces 103, 104, 105, 106. Between first and second layers 101, 102, series of walls 110 provides a series of microchannels 111. There are at least 5 first walls 110 per cm. Each wall 110 has height, $h_{110}$, extending from first layer 101 to second layer 102. For each wall 110 there is a first average width $w_{110-1}$ along the first 2 percent of height $h_{110}$ of wall 110. For each wall 100 there is a second average width $w_{110-2}$ along the last 2 percent of height $h_{110}$ of wall 110. For each wall 110 there is a third average width $w_{110-3}$ along the remaining 96 percent of height $h_{110}$ of wall 110. For at least 50 percent by number of walls 110. First average widths $w_{110-1}$ are less than third average widths $w_{110-3}$.

Figure 2:
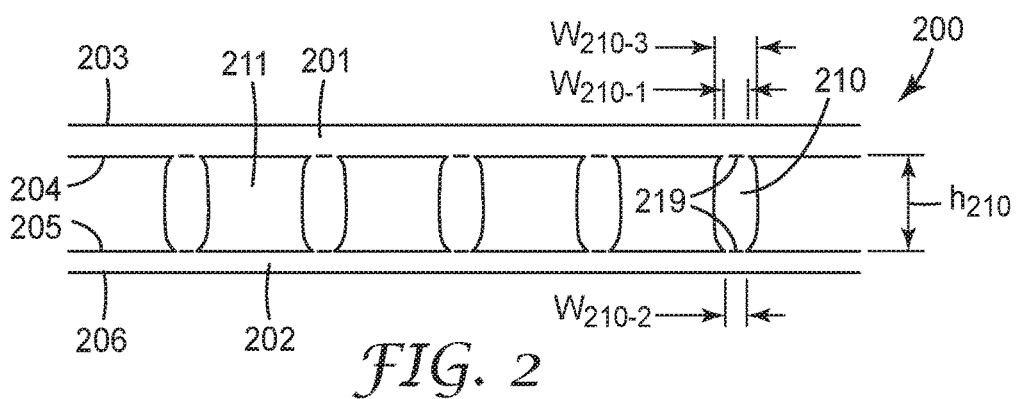
FIG. 2 is a schematic cross-sectional view of an exemplary second coextruded article described herein.

Referring to FIG. 2, exemplary second coextruded article described herein 200 comprises first and second layers 201, 202 each having first and second opposed major surfaces 203, 204, 205, 206. Between first and second layers 201, 202, a series of walls 210 provides series of microchannels 211. There are at least 5 first walls 210 per cm. Each wall 210 has height $h_{210}$ extending from first layer 201 to the second layer 202. For each wall 210 there is first average width $W_{210-1}$ along the first 2 percent of height $H_{210}$ of the wall. For each wall 210 there is a second average width $w_{210-2}$ along the last 2 percent of height $h_{210}$ of wall 210. For each wall 210 there is a third average width $w_{210-3}$ along the remaining 96 percent of height $h_{210}$ of wall 210. For at least 50 percent by number of walls 210. First average widths $w_{210-1}$ are less than third average widths $w_{210-3}$. There are demarcation lines 219 between walls 210 and first and second layers 201, 202.

Figure 3:
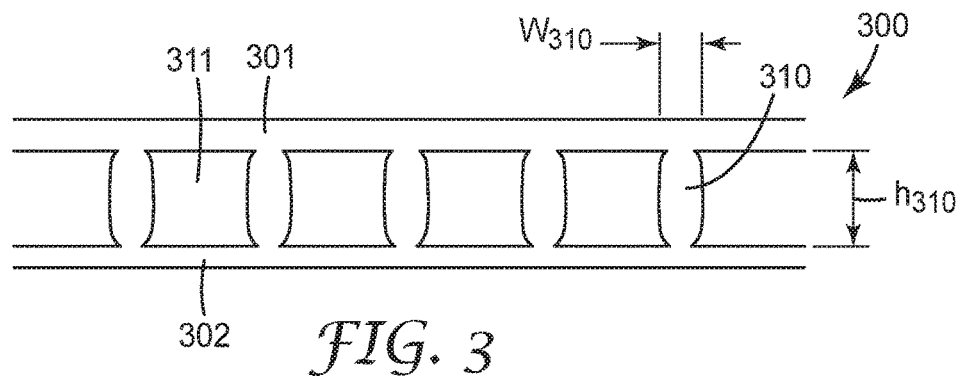
FIG. 3 is a schematic cross-sectional view of an exemplary third coextruded article described herein.

Referring to FIG. 3, exemplary third coextruded article described herein 300 comprises first and second opposed major surfaces 305, 306. Between first and second layers 301, 302, series of walls 310 provides a series of microchannels 311. There are at least 5 first walls 310 per cm. Each wall 310 has height $h_{310}$ extending for first layer 301 to second layer 302. Each wall 310 has an average width $w_{310}$ along its respective height $h_{310}$. No width of wall 310 exceeds more than ±20 percent of average width $w_{310}$ for that wall 310. There is an average width $w_{310\text{-}all}$ of walls 310. No average width $w_{310}$ of respective wall 310 exceeds more than 5 percent of average width of walls 310 $w_{310\text{-}all}$.

In some embodiments of coextruded articles described herein, there are lines of demarcation at the region where the wall joins each layer. A demarcation line or boundary region can be detected using Differential Scanning calorimetry (DSC). Comparing by temperature modulated differential scanning calorimetry a region containing mostly a demarcation line (Region 1) versus a region that does not substantially contain material from the demarcation line (Region 2), a difference in heat flow/heat capacity is observed that is believed to be consistent with an energy release or reduction in molecular orientation/internal stress. That is, although not wanting to be bound by theory, it is believed that the thermal signatures of the regions may be a combination of material thermal transitions and the material response to retained thermal/processing history.

In general, the first and second layers and the wall are joined together to form a continuous coextruded article after the polymer melts exit the die, with microchannels formed between the outside surfaces. The article is extruded, similar to the way that plastic films are extruded. Thus, while the cross direction is composed of a combination of features the machine direction is uniform in structure and can continue for great length. The coextruded article in end use can be cut to short length dependent upon desired application.

These first and second layer orifices are generally parallel to each other. Positioned between these first and second orifices is a plurality of orifices to create the wall section of the channel web. This plurality of orifices is fed typically from a third cavity within the extrusion die. These orifices typically have an aspect ratio greater than 1:1 oriented perpendicular to the layer orifices. The top and bottom of these orifices is positioned close to the first and second layer such that the polymer melt from the plurality of walls will weld to the first and second layer, almost immediately as it exits the die. The slight gap before bonding enables air to access the newly formed channel between the layers to prevent the collapse of the channel as the channel web is formed and pulled from the die. The close proximity of the wall to the layer enables welding with minimal rounding of features as is typical with profile polymer extrusion. Nevertheless, with some rounding of features it will be noted that the walls created in this microchannel coextruded article are narrower in cross sectional thickness near the weld portion, than at say the center of the wall. The difference in the wall thickness at the wall center versus the wall intersection by the distance between the wall orifice and the layer orifices can be controlled, for example, by the distance between orifices used to create the wall and the top and bottom layer. Die designs with very close orifice distances allows the molten polymer to weld together before polymer flow converts the wall shape into a round like strand. Typically, polymer die swell will initiate contact between the flow streams to create a weld line. Very close distances between these orifices enables this coextruded article to be made with wall shapes which are long with narrow cross sections. Typically, the distance between the wall orifice and the layer orifice is less than 1 mm to minimize the wall thickness difference.

The cavities, passageways, and orifices formed to create the layers and walls are formed from shims that are positioned next to each other. Some shims have slots cut to form the passageways. Other shims do not, which create the sidewalls of the passageways. The width of the passageways, and the walls created from adjacent shims are thus formed from the thickness dimension of the shim-stock. Shim-stock with uniform thickness is used to form these dies. Shim-stock thickness can be obtained with thickness variation less than +/−5 micrometers. This precision in thickness enables precision in wall thickness, due to uniform passageway and orifice dimensions.

In some embodiments, the second average widths are less than the third average widths.

In some embodiments of the first and second coextruded articles described herein, wherein no width of a wall exceeds more than 20 (in some embodiments, not more than 25, 30, 40, or even not more than 50) percent of the average width for that wall, wherein there is an average width of the walls, and wherein no average width of a respective wall exceeds more than 5 (in some embodiments, not more than 10, 15, or even not more than 20) percent of the average width of the walls.

In some embodiments, there is an average minimum width for the first walls, and wherein the minimum width of an individual first wall is within ±10 (in some embodiments, ±20, ±30, ±40, or even ±50) percent of the average minimum width for the first walls.

In some embodiments, the microchannels have a width not greater than 2000 (in some embodiment, not greater than 1500, 1000, 500, 200, or even not greater than 100; in some embodiments, in a range from 100 to 2000, 100 to 1000, 100 to 500, 200 to 500, 300 to 400, 200 to 500, or even 100 to 500) micrometers.

In some embodiments, the walls have a height (i.e., between the first and second layers) not greater than 3000 (in some embodiments, not greater than 200, 1000, 500, 250, or up to 100) in some embodiments, in a range from 50 to 3000, 50 to 2000, 100 to 2000, 100 to 1500, 200 to 1500, 200 to 1000, or even 300 to 500) micrometers.

In some embodiments, there are at least plurality of first walls having a width not greater than 400 (in some embodiment, not greater than 300, 200, or even not greater than 100; in some embodiments, in a range from 50 to 400, 50 to 300, 50 to 200, or even 50 to 100) micrometers.

In some embodiments, coextruded articles described herein or parts thereof, can be foamed at different porosity levels using, for example, chemical foaming agents (CFA) (also sometimes referred to as chemical blowing agents (CBA)). The mechanical properties (e.g., compression behavior) of coextruded articles described can be tuned by selectively making some of the segments porous. Other approaches to affecting the mechanical properties of the coextruded articles the quantity of CFA used and CFA activation temperature(s).

In some embodiments, CFAs are exothermic, in others endothermic. Exemplary exothermic CFAs include an azodicarbonamide and sulfonyl-hydrazide. Exemplary endothermic CFAs include sodium bicarbonate and citric acid, and available, for example, under the trade designation "HYDROCEROL BIH-40-E" from Clariant Corporation, Muttenz, Switzerland.

In some embodiments, at least one of the first or second layers are essentially free of closed-cell porosity (i.e., less than 5; in some embodiments, less than 4, 3, 2, or even less than 1) percent by volume closed-cell porosity based on the total volume of the respective layer) (in some embodiments, both the first or second layers are essentially free of closed-cell porosity).

In some embodiments, at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls are essentially free of closed-cell porosity (i.e., less than 5; in some embodiments, less than 4, 3, 2, or even less than 1) percent by volume closed-cell porosity, based on the total volume of the respective wall).

In some embodiments, at least one of the first or second layers have a closed-cell porosity of at least 5 (in some embodiment, at least 10, 15, 20, 25, 30, 35, 40, 45, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective layer.

In some embodiments, at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall.

In some embodiments, all walls between the first and second layers are the first walls.

In some embodiments of coextruded articles described herein, all walls between the first and second layers are the first walls. In some embodiments, further comprising a plurality of second walls. In some embodiments, the second walls have a minimum width not greater than 400 (in some embodiment, not greater than 300, 200, or even not greater than 100; in some embodiments, in a range from 50 to 400, 50 to 300, 50 to 200, or even 50 to 100) micrometers. In some embodiments, there is an average minimum width for the second walls, and wherein the minimum width of an individual second wall is within ±10 (in some embodiments, ±20, ±30, ±40, or even ±50) for the second walls. In some embodiments, at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls are essentially free of closed-cell porosity. In some embodiments, at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall. In some embodiments, all walls between the first and second layers are first and second walls.

A plurality of second wall that alternates with the first walls through the width of the coextruded article can be made by minor variations of the shim dispensing surface. The second walls can be made porous or made with a different material than the first wall, for example, to tune mechanical properties of the coextruded article.

An optional fourth cavity can be used to dispense material to create the second walls. The second wall can be dispensed close to the first wall to create a cojoined wall that is formed when two melt streams for the walls fuse together by die swell phenomena right after exiting the die. In some embodiments of a cojoined wall, one walls can contain functional particles, while the other is free of such particles and provides strengthening to the wall. In some embodiment, the functional particles (e.g., aluminum oxide, aluminum nitride, aluminum trihydrate, boron nitride, copper, graphite, graphene, magnesium oxide, zinc oxide) provide desired electrical or thermal properties to articles described herein.

In some embodiments, the microchannels have a length of at least 15 cm (in some embodiment, at least 20 cm, 25 cm, 30 cm, 50 cm, 1 m, 5 m, 10 m, 25 m, 50 m, or even at least 100 m).

In some embodiments of the first and second coextruded articles described herein, the first layer comprises a first thermoplastic material. In some embodiments, the first thermoplastic material is at least one of polyolefins, ethylene vinyl acetate polymers, polyurethanes, or styrene block copolymers (e.g., styrene-isoprene-styrene block copolymers).

In some embodiments, the second layer comprises a thermoplastic material. In some embodiments, the second thermoplastic material is at least one of polyolefins, ethylene vinyl acetate polymers, polyurethanes, or styrene block copolymers (e.g., styrene-isoprene-styrene block copolymers).

In some embodiments, the walls comprise a third thermoplastic material. In some embodiments, the third thermoplastic material is at least one of polyolefins, ethylene vinyl acetate polymers, polyurethanes, or styrene block copolymers (e.g., styrene-isoprene-styrene block copolymers).

In some embodiments, the first layer comprises a first material, the second layer comprises a second material, and the walls comprise a third material, and wherein the third material is different from both the first and second materials. "Different" as used herein means at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity. Examples of differences in polymeric materials that can provide the difference between polymeric materials include composition, microstructure, color, and refractive index. The term "same" in terms of polymeric materials means not different.

In some embodiments of the first, second, and third coextruded articles described herein, the first layer comprises a first material, the second layer comprises a second material, and the walls comprise a third material, and wherein at least two of the first material, the second material, or the third material are the same.

In some embodiments, the first layer comprises a first material, the second layer comprises a second material, and the walls comprise a third material, and wherein the first material, the second material, and the third material are the same.

In some embodiments, the first major surface of the first layer has functional particles thereon.

In some embodiments, the first layer has a thickness of at least 25 (in some embodiments, at least 50, 75, 100, 125, 150, 175, or even at least 200; in some embodiments, in a range from 25 to 300, 50 to 300, 75 to 300, 100 to 300, 150 to 300, 150 to 250, or even 200 to 250) micrometers.

In some embodiments of the first and second coextruded articles described herein, the second layer has a thickness of at least 25 (in some embodiments, at least 50, 75, 100, 125, 150, 175, or even at least 200; in some embodiments, in a range from 35 to 300, 50 to 300, 75 to 300, 100 to 300, 150 to 300, 150 to 250, or even 200 to 250) micrometers.

In some embodiments having has a thickness of at least 100 (in some embodiments, at least 200, 300, 400, 500, 600, or even at least 700; in some embodiments, in a range from 100 to 2500, 200 to 2500, 300 to 2500, 300 to 2000, 400 to 1500, or even 500 to 1000) micrometers.

In some embodiments of the third coextruded article described herein, for each wall there is a first average width along the first 2 percent of the height of the wall, wherein for each wall there is a second average width along the last 2 percent of the height of the wall, wherein for each wall there is a third average width along the remaining 96 percent of the height of the wall, and wherein for at least 50 (in some embodiments, at least 60, 70, 75, 80, 90, 95, or even 100) percent by number of the walls, the first average widths are less than the third average widths.

Coextruded polymeric articles described herein (including those shown in FIGS. 1, 2, and 3), each of the layers and the walls may be considered monolithic (i.e., having a generally uniform composition) and are not fibrous. The coextruded articles formed are created from individual polymer melt streams which are bonded together to form one article. This is accomplished by formation of weld lines, called demarcation lines at the die region where the extrusion melt from dispensing orifices merge together immediately after exiting the die. Die swell of polymer as polymer exits the orifices is one mechanism that enables the welding together of melt streams. Pulling the combined melt at a slight angle from perpendicular is an additional means to enable welding together of melt streams. Further, the coextruded articles are not nonwoven materials, nor are they assembled with coatings added via as a secondary step.

Exemplary coextruded articles described herein can be made, for by extrusion from a die. An exemplary has a variety of passageways from cavities within the die to a dispensing slot, including exemplary dies described herein (see, e.g., FIG. 4). The die may conveniently be comprised of a plurality of shims. In some embodiments, the plurality of shims comprises a plurality of sequences of shims that includes shims that the shims together defining a first cavity, a second cavity, a third cavity, and optionally a fourth cavity, and a die slot, wherein the die slot has a distal opening, wherein the die slot is comprised of a first plurality of orifices, a second plurality of orifices, and a third plurality of orifices, wherein the plurality of shims comprises a first plurality of a repeating sequence of shims that together provide a fluid passageway between the first cavity and a first orifice, and also together provide a fluid passageway between the second cavity and a second orifice, a second plurality of a repeating sequence of shims that together provide a fluid passageway between the third cavity and a third orifice, and a third plurality of shims that together provide a fluid passageway between the first cavity and a first orifice, and also together provide a fluid passageway between the third cavity and a third orifice, wherein together these shims form a repeating orifice pattern of shims.

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used. The shape of the passageways within, for example, a sequence of shims, may be identical or different. Examples of passageway cross-sectional shapes include round, square, and rectangular shapes. In some embodiments, the shims that provide a passageway between one cavity and the dispensing slot might have a flow restriction compared to the shims that provide a passageway between another cavity and the dispensing slot. The width of the distal opening within, for example, a different sequence of shims, may be identical or different. For example, the portion of the distal opening provided by the shims that provide a passageway between one cavity and the dispensing slot could be narrower than the portion of the distal opening provided by the shims that provide a passageway between another cavity and the dispensing slot.

Individual cavities and passageways provide a conduit for polymer to orifices to create the first and second layers and the walls. These individual flow streams merge together to form a continuous, solid polymeric coextruded article, at the die slot portion of the die. Spacing between the walls and layer slots form demarcation lines connecting the first and second layers and the walls.

In some embodiments, extrusion dies described herein include a pair of end blocks for supporting the plurality of shims. In these embodiments, it may be convenient for one, or even all, of the shims to each have at least one through-holes for the passage of connectors between the pair of end blocks. Bolts disposed within such through-holes are one convenient approach for assembling the shims to the end blocks, although the ordinary artisan may perceive other alternatives for assembling the extrusion die. In some embodiments, the at least one end block has an inlet port for introduction of fluid material into one, or both, of the cavities.

In some embodiments, the shims will be assembled according to a plan that provides a repeating sequence of shims of diverse types. The repeating sequence can have diverse numbers of shims per repeat. For a first example, a repeating sequence utilizing four shim types is described below to create the orifice pattern shown in FIG. 4 to create the polymeric coextruded articles shown in FIGS. 1-3. When that repeating sequence is properly provided with molten polymer, it extrudes a continuous film through the die slot to create the polymeric coextruded article with layers, walls, and segments.

In some embodiments, the assembled shims (conveniently bolted between the end blocks) further comprise a manifold body for supporting the shims. The manifold body has at least one (e.g., in some embodiments two three, four, or more) manifold therein, the manifold having an outlet. An expansion seal (e.g., made of copper or alloys thereof) is disposed to seal the manifold body and the shims, such that the expansion seal defines a portion of at least one of the cavities (in some embodiments, a portion of both the first and second cavities), and such that the expansion seal allows a conduit between the manifold and the cavity.

Typically, the passageway between cavity and dispensing orifice is up to 5 mm in length. Sometimes the fluid passageways leading to one array has greater fluid restriction than the fluid passageways leading to one or more of the other arrays.

The shims for dies described herein typically have thicknesses in the range from 50 micrometers to 125 micrometers, although thicknesses outside of this range may also be useful. Typically, the fluid passageways have thicknesses in a range from 50 micrometers to 750 micrometers, and lengths less than 5 mm (with generally a preference for smaller lengths for decreasingly smaller passageway thicknesses), although thicknesses and lengths outside of these ranges may also be useful. For large diameter fluid passageways, several smaller thickness shims may be stacked together, or single shims of the desired passageway width may be used.

The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion. To aid in alignment, an alignment key can be cut into the shims. Also, a vibrating table can be useful to provide a smooth surface alignment of the extrusion tip.

In practicing methods described herein, the polymeric materials might be solidified simply by cooling. This can be conveniently accomplished passively by ambient air, or actively by, for example, quenching the extruded first and second polymeric materials on a chilled surface (e.g., a chilled roll). In some embodiments, the first and/or second and/or third polymeric materials are low molecular weight polymers that need to be cross-linked to be solidified, which can be done, for example, by electromagnetic or particle radiation. In some embodiments, it is desirable to maximize the time to quenching to increase the bond strength.

Figure 4:
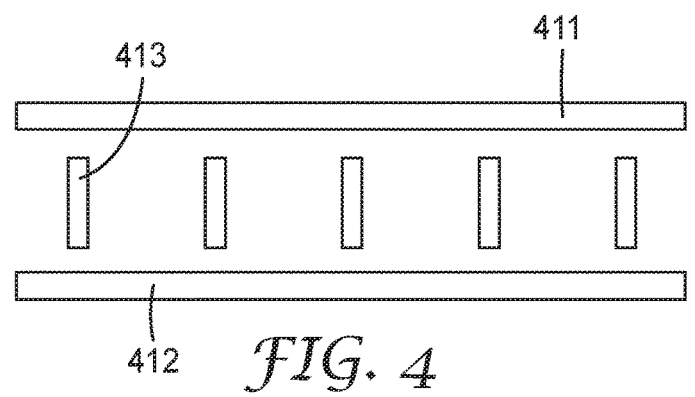
FIG. 4 is a schematic cross-sectional view of an exemplary die cavity pattern just upstream from the dispensing slot of the die employed in the formation of an exemplary polymeric coextruded coextruded article described herein.

FIG. 4 is a schematic cross-sectional view of an exemplary die orifice pattern just upstream from the dispensing slot of the die employed in the formation of an exemplary polymeric coextruded article described herein. Orifice plan shows first orifice 411, second orifice 412, and third orifices 413. As will be described in detail later, the orifices are spaced apart to provide passageway sidewalls between passageways with the use of spacer shims. The individual flow streams are merged together, with demarcation lines to form a continuous polymeric coextruded article after the polymer melt exits the die. The demarcation lines formed between the first layer and the wall and between the second layer and the wall is formed after the polymer exits the die slot. The distance between the layers and the walls are close together, these layers and the wall thus bond together before quenching. Nevertheless, because the wall melt leaves the die unattached it will begin to round over, creating a characteristic narrowing at the top and the bottom of the wall. Typically, in profile extrusion of channels, the intersections are greater in cross section thickness than the average wall thickness. In this case they are less.

Figure 5A:
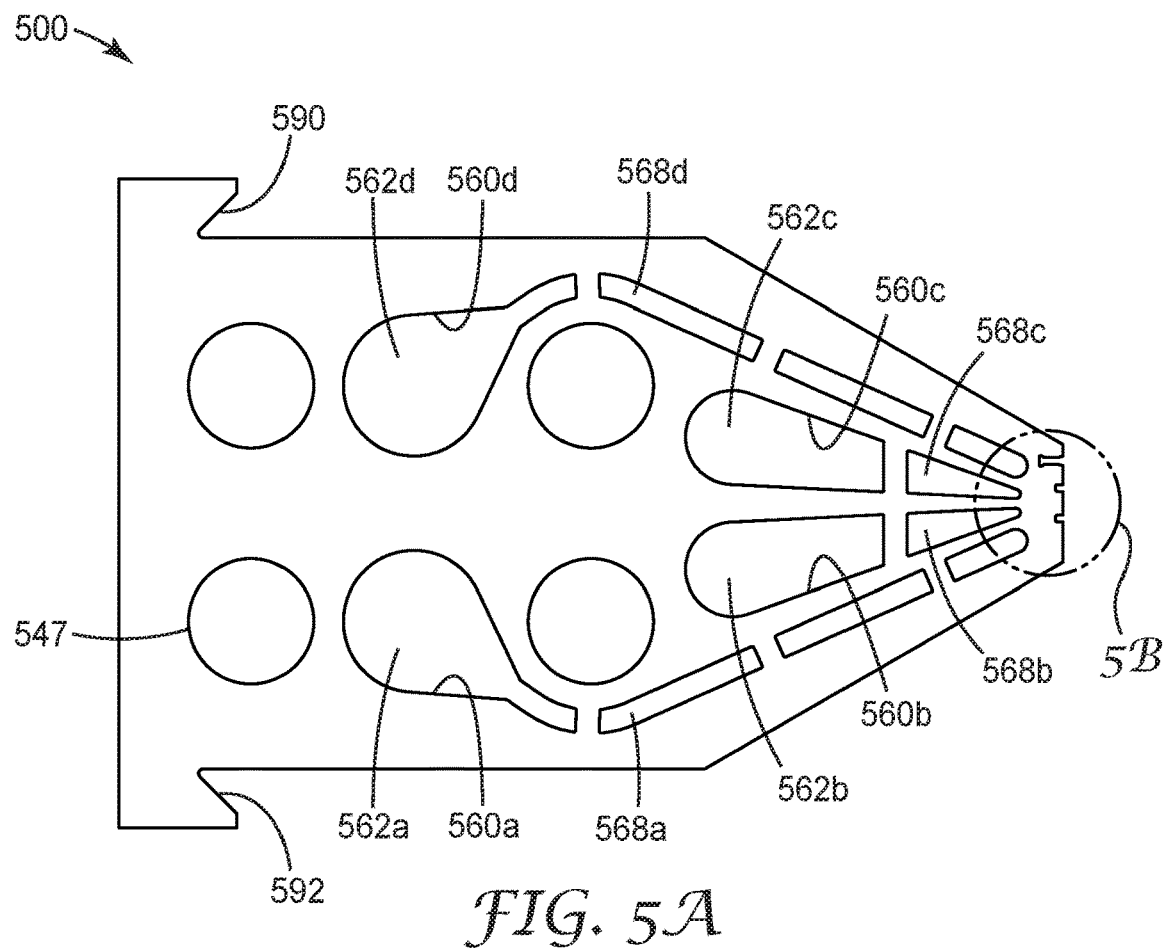
FIG. 5A is a plan view of an exemplary embodiment of a shim suited to form a sequence of shims capable of forming an exemplary coextruded polymeric article, for example, as shown in the schematic cross-sectional views of FIGS. 1, 2, and 3.
Figure 5B:
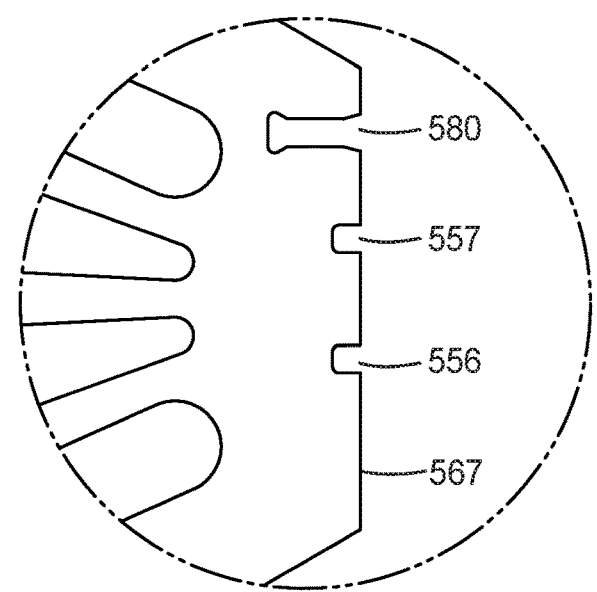
FIG. 5B is an expanded region near the dispensing surface of the shim shown in FIG. 5A.
Figure 8:
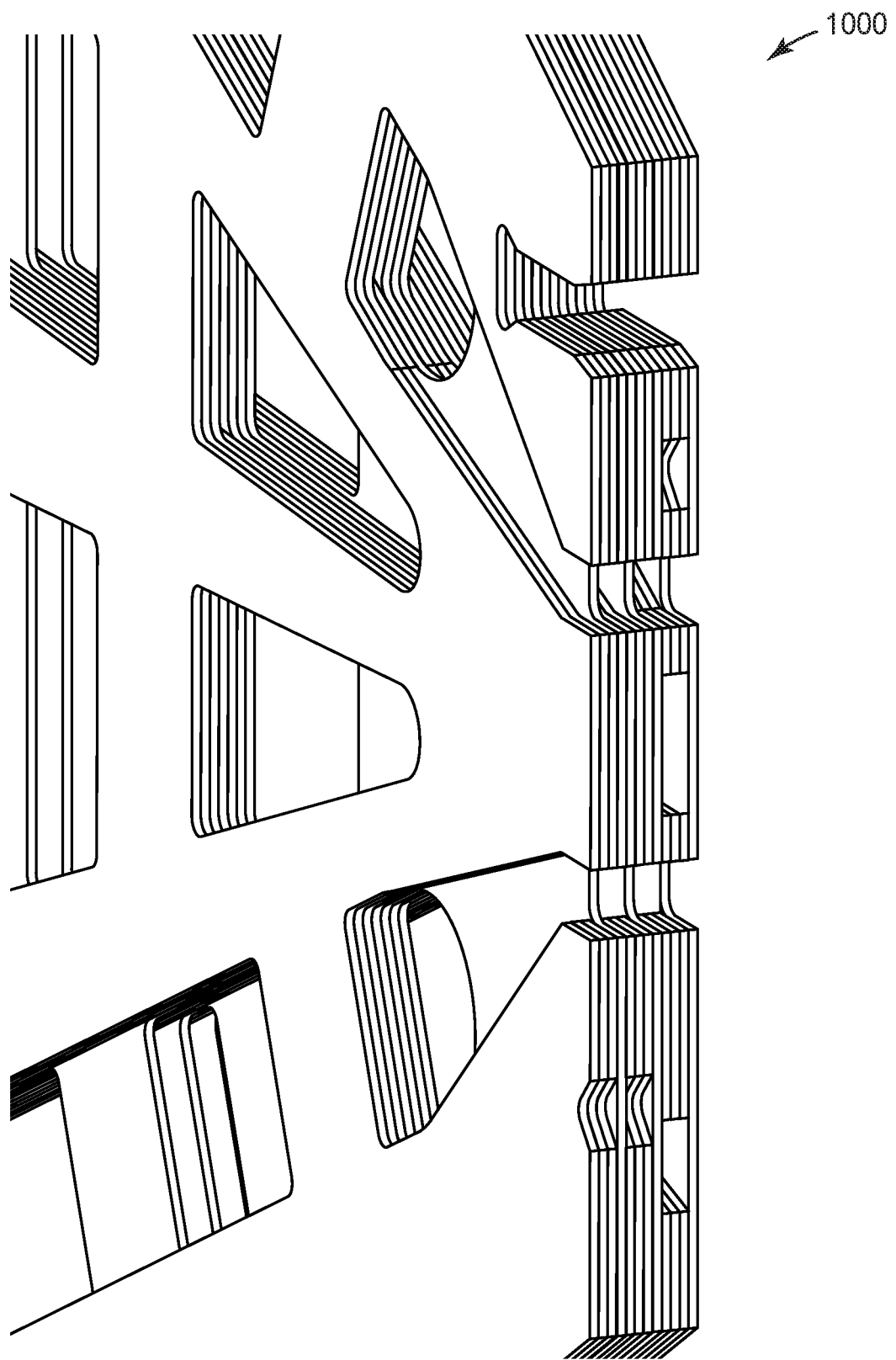
FIG. 8 is a perspective assembly drawing of several different exemplary sequences of shims employing the shims of FIGS. 5A-7A for making exemplary coextruded polymeric articles described herein, including the layer, the wall, and the segments in a repeating arrangement as shown in FIGS. 1, 2, and 3.
Figure 9:
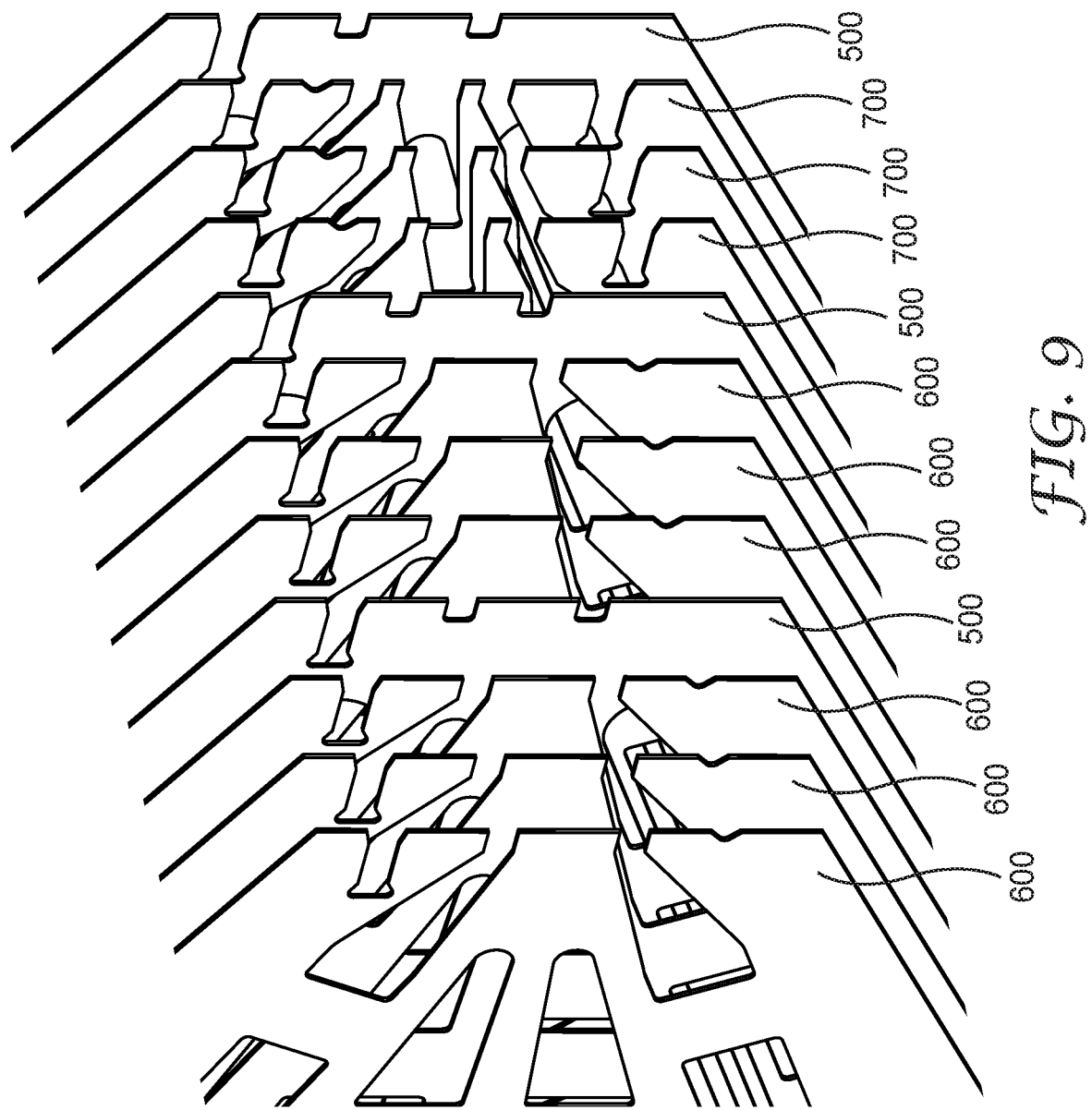
FIG. 9 is a perspective view of the some of the sequence of shims of FIG. 8, further exploded to reveal some individual shims.

Referring now to FIGS. 5A, and 5B, a plan view of shim 500 is illustrated. Shim 500 has first aperture 560*a*, second aperture 560b third aperture 560c, and fourth aperture 560d. When shim 500 is assembled with others as shown in FIGS. 8 and 9, aperture 560a aids in defining first cavity 562a, aperture 560b aids in defining second cavity 562b, aperture 560c aids in defining third cavity 562c, and aperture 560d aids in defining third cavity 562d. Passageways 568a, 568b, 568c, and 568d cooperate with analogous passageways on adjacent shims to allow passage from cavities 562a, 562b, 562c, and 562d to the dispensing surfaces of the appropriate shims when the shims are assembled as shown in FIGS. 8 and 9.

Shim 500 has several holes 547 to allow the passage of, for example, bolts, to hold shim 500 and others to be described below into an assembly. Shim 500 also has dispensing surface 567, and in this particular embodiment, dispensing surface 567 has indexing groove 580 which can receive an appropriately shaped key to ease assembling diverse shims into a die. This embodiment has shoulders 590 and 592 which can assist in mounting the assembled die with a mount of the type shown in FIG. 11. Shim 500 has dispensing opening 556 and 557, but it will be noted that this shim has no connection between dispensing opening 556 or 557 and any of cavities 562a, 562b, 562c, or 562d. Shim 500 is a spacer shim which provides separation walls for passageways. In this case, this spacer shim is optional because this particular design does not require a passageway wall to separate flow streams in these locations. These optional spacer shims may be used to regulate flow across die regions. Opening 556 and 557 provides a continuous dispensing slot for extrusion of the first and second layers.

Figure 6A:
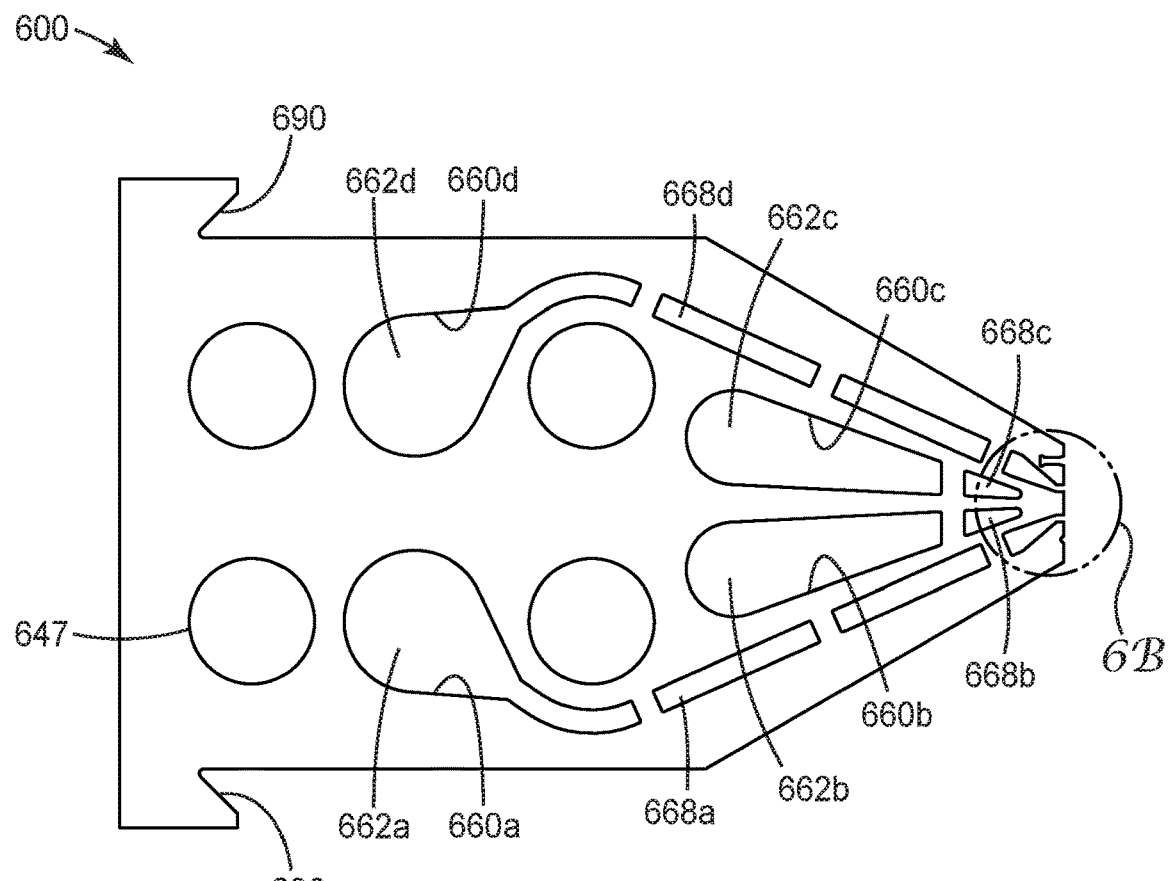
FIG. 6A is a plan view of an exemplary embodiment of a shim suited to form a sequence of shims capable of forming a coextruded polymeric article, for example, as shown in the schematic cross-sectional views of FIGS. 1, 2 and 3.
Figure 6B:
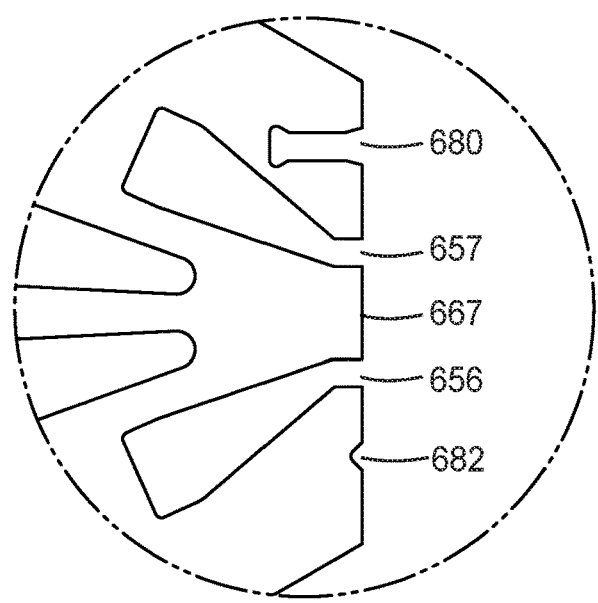
FIG. 6B is an expanded region near the dispensing surface of the shim shown in FIG. 6A.

Referring to FIGS. 6A, and 6B, a plan view of shim 600 is illustrated. Shim 600 has first aperture 660a, second aperture 660b, third aperture 660c, and fourth aperture 660d. When shim 600 is assembled with others as shown in FIGS. 8 and 9, aperture 660a aids in defining first cavity 662a, aperture 660b aids in defining second cavity 662b, aperture 660c aids in defining third cavity 662c, and aperture 660d aids in defining third cavity 662d. Passageways 668a, 668b, 668c, and 668d cooperate with analogous passageways on adjacent shims to allow passage from cavities 662a, 662b, 662c, and 662d to the dispensing surfaces of the appropriate shims when the shims are assembled as shown in FIGS. 8 and 9.

Shim 600 has several holes 647 to allow the passage of, for example, bolts, to hold shim 600 and others to be described below into an assembly. Shim 600 also has dispensing surface 667, and in this particular embodiment, dispensing surface 667 has indexing groove 680 which can receive an appropriately shaped key to ease assembling diverse shims into a die. The shim may also have identification notch 682 to help verify that the die has been assembled in the desired manner. This embodiment has shoulders 690 and 692 which can assist in mounting the assembled die with a mount of the type shown in FIG. 11. Shim 600 has dispensing opening 656 and 657, in dispensing surface 667. Dispensing opening 656 and 657 may be more clearly seen in the expanded view shown in FIG. 6B. It might seem that there is no path from cavity 662a to dispensing opening 656, via, for example, passageway 668a, but the flow has a route in the perpendicular-to-the-plane-of-the-drawing dimension when the sequence of FIG. 6 is completely assembled. Shim 600 also has dispensing opening 657, with connection to cavity 662d. Opening 656 forms a portion of the first layer, opening 657 forms a portion of the second layer.

Figure 7A:
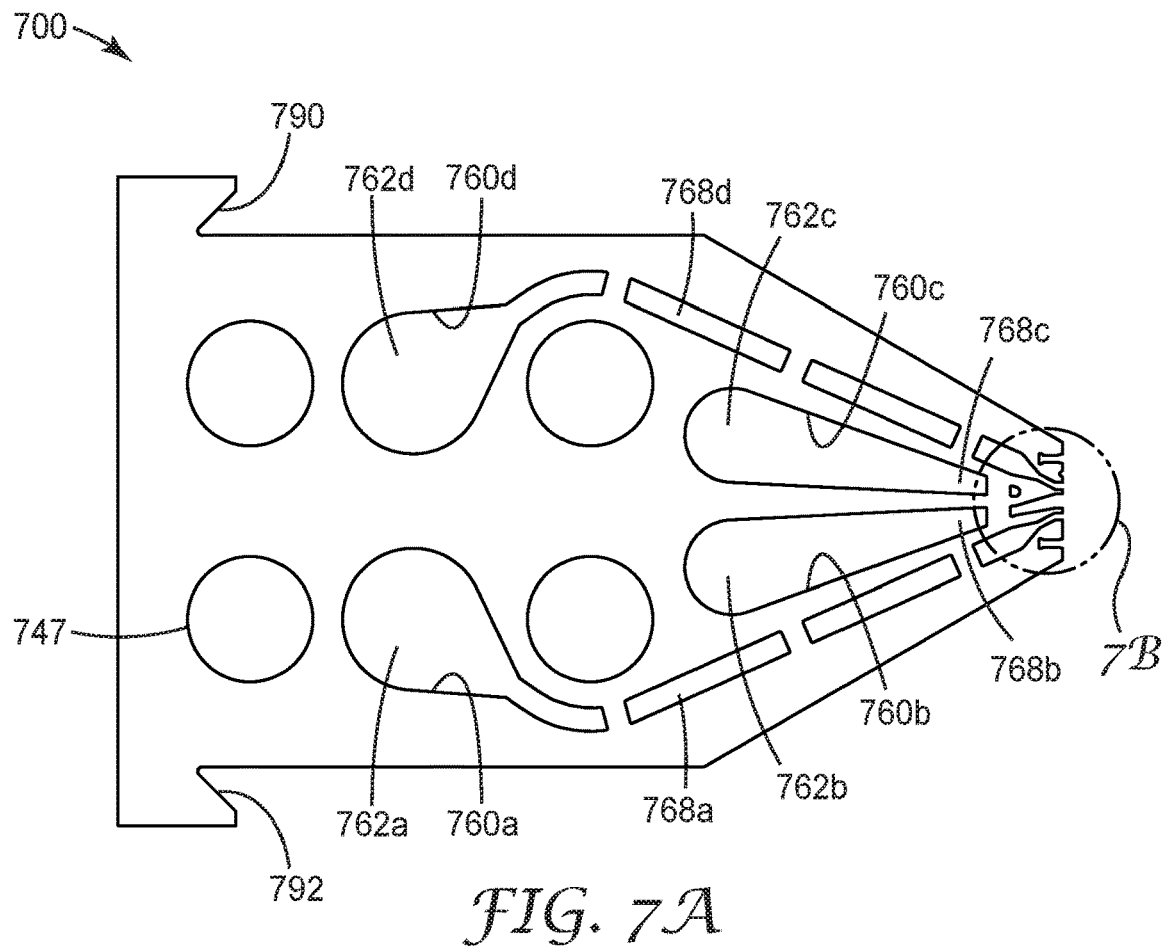
FIG. 7A is a plan view of an exemplary embodiment of a shim suited to form a sequence of shims capable of forming a coextruded polymeric article, for example, as shown in the schematic cross-sectional views of FIGS. 1, 2 and 3.
Figure 7B:
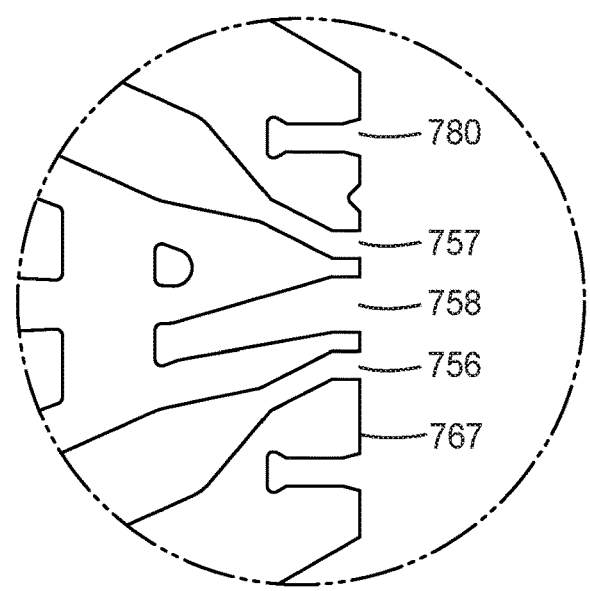
FIG. 7B is an expanded region near the dispensing surface of the shim shown in FIG. 7A.
Figure 10:
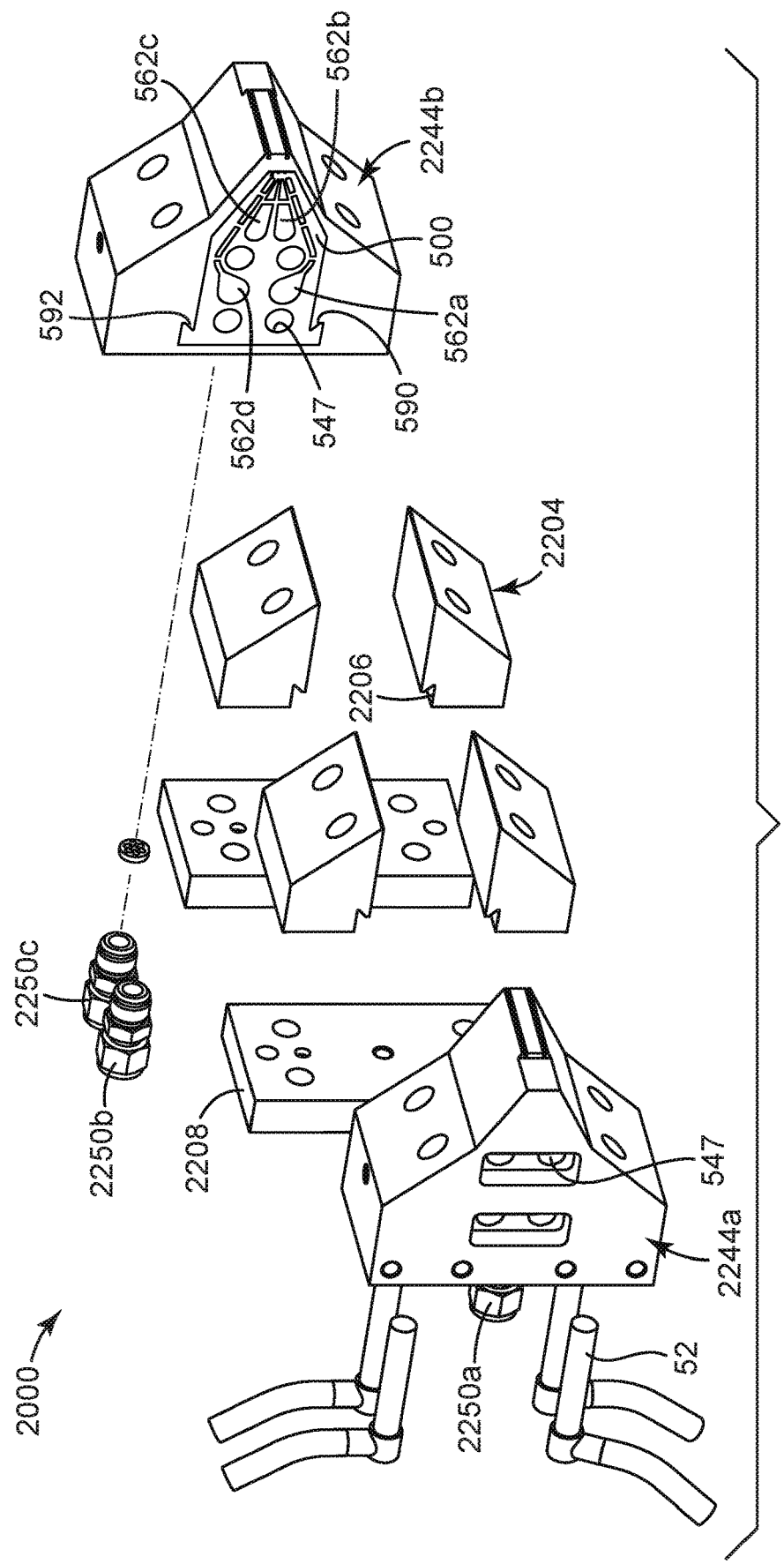
FIG. 10 is an exploded perspective view of an example of a mount suitable for an extrusion die composed of multiple repeats of the sequence of shims of FIGS. 8 and 9.

Referring to FIGS. 7A, and 7B, a plan view of shim 700 is illustrated. Shim 700 has first aperture 760a, second aperture 760b, third aperture 760c, and fourth aperture 760d. When shim 700 is assembled with others as shown in FIGS. 9 and 10, aperture 760a aids in defining first cavity 762a, aperture 760b aids in defining second cavity 762b, aperture 760c aids in defining third cavity 762c, and aperture 760d aids in defining third cavity 762d. Passageways 768a, 768b, 768c, and 768d cooperate with analogous passageways on adjacent shims to allow passage from cavities 762a, 762b, 762c, and 762d to the dispensing surfaces of the appropriate shims when the shims are assembled as shown in FIGS. 8 and 9.

Shim 700 has several holes 747 to allow the passage of, for example, bolts, to hold shim 700 and others to be described below into an assembly. Shim 700 also has dispensing surface 767, and in this particular embodiment, dispensing surface 767 has indexing groove 780 which can receive an appropriately shaped key to ease assembling diverse shims into a die. This embodiment has shoulders 790 and 792 which can assist in mounting the assembled die with a mount of the type shown in FIG. 11. Shim 700 has dispensing opening 756, 757, and 758 with connection to cavities 762a, 762d, and also 762b. Opening 756 forms a portion of the first layer, opening 757 forms a portion of the second layer, and opening 758 forms a portion of the wall.

Referring to FIG. 8, a perspective assembly drawing of a several different repeating sequences of shims, collectively 1000, employing the shims of FIGS. 5-7 so as to be able to produce polymeric coextruded article 100 shown in FIG. 1, 200 in FIG. 2, and coextruded article 300 in FIG. 3 is shown. It should be noted in FIG. 8 that the dispensing slots for the first and second layers, are formed by dispensing openings 556, 656, and 756 for the first layer and 557, 657, and 757 for the second layer. The dispensing openings for the wall sections are formed from opening 758 in shim 700.

Referring to FIG. 9, an exploded perspective assembly drawing of a repeating sequence of shims employing the shims of FIGS. 5-7 is illustrated. In the particular illustrated embodiment, the repeating sequence includes, from bottom to top as the drawing is oriented, one instance of shim 500, three instances of shim 700, one instance of shim 500, three instances of shim 600, one instance of shim 500, three instances of shim 600. In this view, it can be appreciated how the three orifices are merged together to create a continuous first and second layer with individual wall orifices set between layers.

Referring to FIG. 10, an exploded perspective view of a mount 2000 suitable for an extrusion die composed of multiple repeats of the repeating sequence of shims of FIGS. 8 and 9 is illustrated. Mount 2000 is particularly adapted to use shims 500, 600, and 700 as shown in FIGS. 5-7. For visual clarity, however, only a single instance of shims is shown in FIG. 10. The multiple repeats of the repeating sequence of shims of FIGS. 8 and 9 are compressed between two end blocks 2244a and 2244b. Conveniently, through bolts can be used to assemble the shims to end blocks 2244a and 2244b, passing through holes 547 in shims 500 et al.

In this embodiment, inlet fittings provide a flow path for three streams of molten polymer through end blocks 2244a and 2244b to cavities 562a, 562b, and 562c, and 562d. Compression blocks 2204 have notch 2206 that conveniently engages the shoulders on shims (e.g., 590 and 592) on 500. When mount 2000 is completely assembled, compression blocks 2204 are attached by, for example, machine bolts to backplates 2208. Holes are conveniently provided in the assembly for the insertion of cartridge heaters 52.

Figure 11:
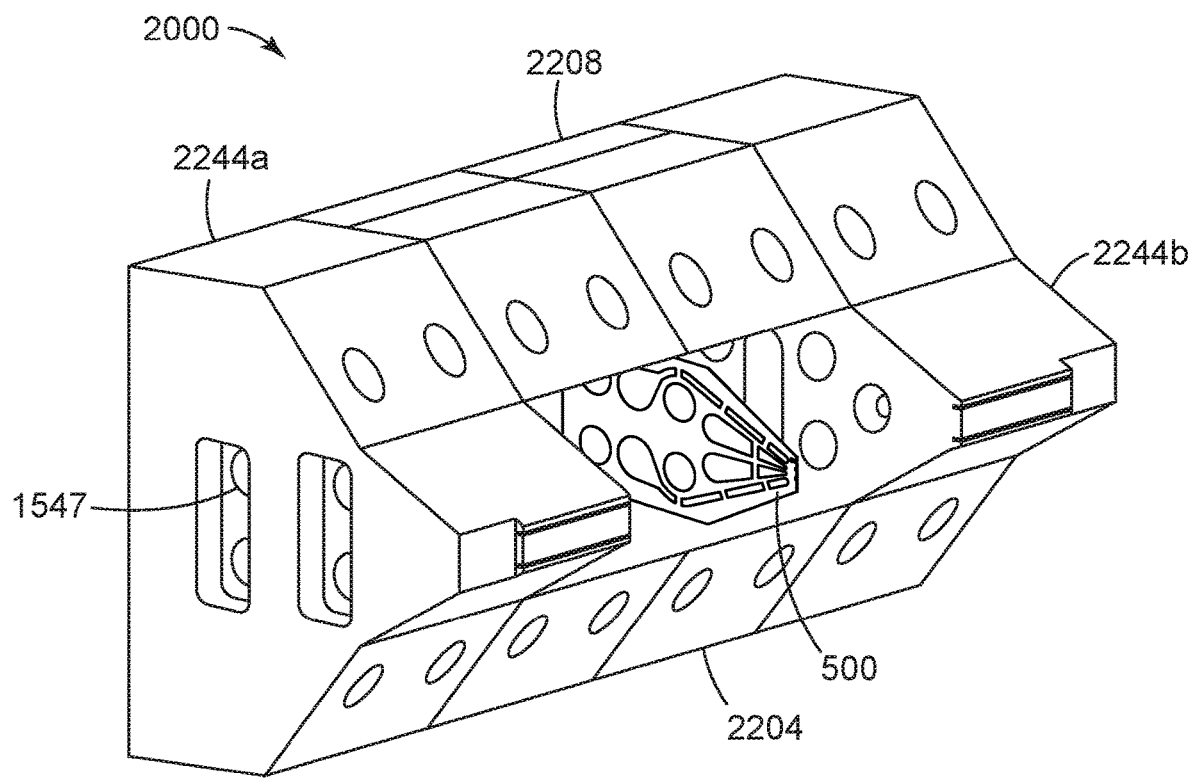
FIG. 11 is a perspective view of the mount of FIG. 10 in an assembled state.

Referring to FIG. 11, a perspective view of the mount 2000 of FIG. 11 is illustrated in a partially assembled state.

A few shims, for example, 500 are in their assembled positions to show how they fit within mount 2000, but most of the shims that would make up an assembled die have been omitted for visual clarity.

Methods to make specific coextruded articles described herein may involve use of particular materials (e.g., same, different, or a combination thereof first, second and third materials). Example methods for making coextruded articles described herein include the following.

Coextruded articles described herein can be made for example, by a method comprising:

providing an extrusion die comprising a first cavity, a second cavity, a third cavity, and a first die slot, a second die slot, and a plurality of third die slots, wherein each die slot has a distal opening, wherein there is a fluid passageway between the first cavity and the first die slot, a fluid passageway between the second cavity and a second die slot, and a plurality of fluid passageways between the third cavity and the plurality of third die slots;

providing via extrusion a first material to the first cavity of the extrusion die, a second material to the second cavity of the extrusion die, and a third material to the third cavity of the extrusion die;

extruding the layers from the distal opening of the die slots; and forming together the extrusion melt from first and second die slot with the plurality of extrudate from the third die slots into one continuous coextruded article; and quenching the extruded layer.

Embodiment of coextruded articles described herein are useful, for example, in cushioning applications where high levels of compression are desired. Conventional foamed sheets are typically limited in the amount of void space that can be generated, whereas embodiments of coextruded articles described herein can have relatively high void content (i.e., greater than 50%).

Embodiments of coextruded articles described herein are useful, for example, in applications using liquid or gas materials for heat transfer. For example, a coextruded article described herein can be placed in contact with components requiring temperature control, wherein the channels contain heat transfer media.

Embodiments of coextruded articles described herein may also be used as spacer webs. For example, coextruded articles described herein can provide significant spacing with a minimal amount of material usage. For example, coextruded articles which require beam strength with minimal weight can be created with rigid films separated by a coextruded article described herein.

EXEMPLARY EMBODIMENTS

1A. A coextruded article comprising first and second layers each having first and second opposed major surfaces and between the first and second layers a series of first walls providing a series of microchannels, wherein there are at least 5 (in some embodiments, at least 10, 15, 20, 25, 30, 35, or even up to 40) first walls per cm, wherein each wall has a height extending from the first layer to the second layer, wherein for each wall there is a first average width along the first 2 percent of the height of the wall, wherein for each wall there is a second average width along the last 2 percent of the height of the wall, wherein for each wall there is a third average width along the remaining 96 percent of the height of the wall, and wherein for at least 50 (in some embodiments, at least 60, 70, 75, 80, 90, 95, or even 100) percent by number of the walls, the first average widths are less than the third average widths.

2A. The coextruded article of Exemplary Embodiment 1A, the second average widths are less than the third average widths.

3A. The coextruded article of any preceding A Exemplary Embodiment, wherein no width of a wall exceeds more than 20 (in some embodiments, not more than 25, 30, 40, or even not more than 50) percent of the average width for that wall, wherein there is an average width of the walls, and wherein no average width of a respective wall exceeds more than 5 (in some embodiments, not more than 10, 15, or even not more than 20) percent of the average width of the walls.

4A. The coextruded article of any preceding A Exemplary Embodiment, wherein there is an average minimum width for the first walls, and wherein the minimum width of an individual first wall is within ±10 (in some embodiments, ±20, ±30, ±40, or even ±50) percent of the average minimum width for the first walls.

5A. The coextruded article of any preceding A Exemplary Embodiment, wherein the microchannels have a width not greater than 2000 (in some embodiment, not greater than 1500, 1000, 500, 200, or even not greater than 100; in some embodiments, in a range from 100 to 2000, 100 to 1000, 100 to 500, 200 to 500, 300 to 400, 200 to 500, or even 100 to 500) micrometers.

6A. The coextruded article of any preceding A Exemplary Embodiment, wherein the walls have a height (i.e., between the first and second layers) not greater than 3000 (in some embodiments, not greater than 200, 1000, 500, 250, or up to 100) in some embodiments, in a range from 50 to 3000, 50 to 2000, 100 to 2000, 100 to 1500, 200 to 1500, 200 to 1000, or even 300 to 500) micrometers.

7A. The coextruded article of any preceding A Exemplary Embodiment, wherein there are at least plurality of first walls having a width not greater than 400 (in some embodiment, not greater than 300, 200, or even not greater than 100; in some embodiments, in a range from 50 to 400, 50 to 300, 50 to 200, or even 50 to 100) micrometers.

8A. The coextruded article of any preceding A Exemplary Embodiment, wherein at least one of the first or second layers are essentially free of closed-cell porosity (i.e., less than 5; in some embodiments, less than 4, 3, 2, or even less than 1) percent by volume closed-cell porosity based on the total volume of the respective layer) (in some embodiments, both the first or second layers are essentially free of closed-cell porosity).

9A. The coextruded article of any preceding A Exemplary Embodiment, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls are essentially free of closed-cell porosity (i.e., less than 5; in some embodiments, less than 4, 3, 2, or even less than 1) percent by volume closed-cell porosity, based on the total volume of the respective wall).

10A. The coextruded article of any preceding A Exemplary Embodiment, wherein at least one of the first or second layers have a closed-cell porosity of at least 5 (in some embodiment, at least 10, 15, 20, 25, 30, 35, 40, 45, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective layer.

11A. The coextruded article of any preceding A Exemplary Embodiment, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall.

12A. The coextruded article of any preceding A Exemplary Embodiment, wherein all walls between the first and second layers are the first walls.

13A. The coextruded article of any preceding A Exemplary Embodiment further comprising a plurality of second walls.

14A. The coextruded article of Exemplary Embodiment 13A, wherein the second walls have a minimum width not greater than 400 (in some embodiment, not greater than 300, 200, or even not greater than 100; in some embodiments, in a range from 50 to 400, 50 to 300, 50 to 200, or even 50 to 100) micrometers.

15A. The coextruded article of either Exemplary Embodiment 13A or 14A, wherein there is an average minimum width for the second walls, and wherein the minimum width of an individual second wall is within ±10 (in some embodiments, ±20, ±30, ±40, or even ±50) for the second walls.

16A. The coextruded article of any of Exemplary Embodiments 13A to 15A, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls are essentially free of closed-cell porosity.

17A. The coextruded article of any of Exemplary Embodiments 13A to 16A, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall.

18A. The coextruded article of any of Exemplary Embodiments 13A to 17A, wherein all walls between the first and second layers are first and second walls.

19A. The coextruded article of any preceding A Exemplary Embodiment, wherein the microchannels have a length of at least 15 cm (in some embodiment, at least 20 cm, 25 cm, 30 cm, 50 cm, 1 m, 5 m, 10 m, 25 m, 50 m, or even at least 100 m).

20A. The coextruded article of any preceding A Exemplary Embodiment, wherein the first layer comprises a first thermoplastic material.

21A. The coextruded article of Exemplary Embodiment 20A, wherein the first thermoplastic material is at least one of polyolefins, ethylene vinyl acetate polymers, polyurethanes, or styrene block copolymers (e.g., styrene-isoprene-styrene block copolymers).

22A. The coextruded article of any preceding A Exemplary Embodiment, wherein the second layer comprises a thermoplastic material.

23A. The coextruded article of Exemplary Embodiment 22A, wherein the second thermoplastic material is at least one of polyolefins, ethylene vinyl acetate polymers, polyurethanes, or styrene block copolymers (e.g., styrene-isoprene-styrene block copolymers).

24A. The coextruded article of any preceding A Exemplary Embodiment, wherein the walls comprises a third thermoplastic material.

25A. The coextruded article of Exemplary Embodiment 24A, wherein the third thermoplastic material is at least one of polyolefins, ethylene vinyl acetate polymers, polyurethanes, or styrene block copolymers (e.g., styrene-isoprene-styrene block copolymers).

26A. The coextruded article of any preceding A Exemplary Embodiment, wherein the first layer comprises a first material, the second layer comprises a second material, and the walls comprise a third material, and wherein the third material is different from both the first and second materials.

27A. The coextruded article of any of Exemplary Embodiments 1A to 25A, wherein the first layer comprises a first material, the second layer comprises a second material, and the walls comprise a third material, and wherein at least two of the first material, the second material, or the third material are the same.

28A. The coextruded article of any of Exemplary Embodiments 1A to 25A, wherein the first layer comprises a first material, the second layer comprises a second material, and the walls comprise a third material, and wherein the first material, the second material, and the third material are the same.

29A. The coextruded article of any preceding A Exemplary Embodiment, wherein the first major surface of the first layer has functional particles thereon.

30A. The coextruded article of any preceding A Exemplary Embodiment, the first layer has a thickness of at least 25 (in some embodiments, at least 50, 75, 100, 125, 150, 175, or even at least 200; in some embodiments, in a range from 25 to 300, 50 to 300, 75 to 300, 100 to 300, 150 to 300, 150 to 250, or even 200 to 250) micrometers.

31A. The coextruded article of any preceding A Exemplary Embodiment, the second layer has a thickness of at least 25 (in some embodiments, at least 50, 75, 100, 125, 150, 175, or even at least 200; in some embodiments, in a range from 35 to 300, 50 to 300, 75 to 300, 100 to 300, 150 to 300, 150 to 250, or even 200 to 250) micrometers.

32A. The coextruded article of any preceding A Exemplary Embodiment having has a thickness of at least 100 (in some embodiments, at least 200, 300, 400, 500, 600, or even at least 700; in some embodiments, in a range from 100 to 2500, 200 to 2500, 300 to 2500, 300 to 2000, 400 to 1500, or even 500 to 1000) micrometers.

1B. A method of making the coextruded article of any preceding A Exemplary Embodiment, the method comprising:
  providing an extrusion die comprising a first cavity, a second cavity, a third cavity, and a first die slot, a second die slot, and a plurality of third die slots, wherein each die slot has a distal opening, wherein there is a fluid passageway between the first cavity and the first die slot, a fluid passageway between the second cavity and a second die slot, and a plurality of fluid passageways between the third cavity and the plurality of third die slots;
  providing via extrusion a first material to the first cavity of the extrusion die, a second material to the second cavity of the extrusion die, and a third material to the third cavity of the extrusion die;
  extruding the layers from the distal opening of the die slots; and forming together the extrusion melt from first and second die slot with the plurality of extrudate from the third die slots into one continuous coextruded article; and
  quenching the extruded layer.

1C. A coextruded article comprising first and second layers each having first and second opposed major surfaces and between the first and second layers a series of first walls providing a series of microchannels, wherein there are at least 5 (in some embodiments, at least 10, 15, 20, 25, 30, 35, or even up to 40) first walls per cm, wherein each wall has a height extending from the first layer to the second layer, wherein for each wall there is a first average width along the first 2 percent of the height of the wall, wherein for each wall there is a second average width along the last 2 percent of the height of the wall, wherein for each wall there is a third average width along the remaining 96 percent of the height of the wall, and wherein for at least 50 (in some embodiments, at least 60, 70, 75, 80, 90, 95, or even 100) percent by number of the walls, the first average widths are less than the third average widths, wherein there are demarcation lines between the walls and the first and second layers.

2C. The coextruded article of Exemplary Embodiment 1C, wherein the second average widths are less than the third average widths.

3C. The coextruded article of any preceding C Exemplary Embodiment, wherein no width of a wall exceeds more than ±20 (in some embodiments, not more than ±25, ±30, ±40, or even not more than ±50) percent of the average width for that wall, wherein there is an average width of the walls, and wherein no average width of a respective wall exceeds more than 5 (in some embodiments, not more than 10, 15, or even not more than 20) percent of the average width of the walls.

4C. The coextruded article of any preceding C Exemplary Embodiment, wherein there is an average minimum width for the first walls, and wherein the minimum width of an individual first wall is within ±10 (in some embodiments, ±20, ±30, ±40, or even ±50) percent of the average minimum width for the first walls.

5C. The coextruded article of any preceding C Exemplary Embodiment, wherein the microchannels have a width not greater than 2000 (in some embodiment, not greater than 1500, 1000, 500, 200, or even not greater than 100; in some embodiments, in a range from 100 to 2000, 100 to 1000, 100 to 500, 200 to 500, 300 to 400, 200 to 500, or even 100 to 500) micrometers.

6C. The coextruded article of any preceding C Exemplary Embodiment, wherein the walls have a height (i.e., between the first and second layers) not greater than 3000 (in some embodiments, not greater than 2000, 1000, 500, 250, or up to 100) in some embodiments, in a range from 50 to 3000, 50 to 2000, 100 to 2000, 100 to 1500, 200 to 1500, 200 to 1000, or even 300 to 500) micrometers.

7C. The coextruded article of any preceding C Exemplary Embodiment, wherein there are at least plurality of first walls having a width not greater than 400 (in some embodiment, not greater than 300, 200, or even not greater than 100; in some embodiments, in a range from 50 to 400, 50 to 300, 50 to 200, or even 50 to 100) micrometers.

8C. The coextruded article of any preceding C Exemplary Embodiment, wherein at least one of the first or second layers are essentially free of closed-cell porosity (i.e., less than 5; in some embodiments, less than 4, 3, 2, or even less than 1) percent by volume closed-cell porosity based on the total volume of the respective layer) (in some embodiments, both the first or second layers are essentially free of closed-cell porosity).

9C. The coextruded article of any preceding C Exemplary Embodiment, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls are essentially free of closed-cell porosity (i.e., less than 5; in some embodiments, less than 4, 3, 2, or even less than 1) percent by volume closed-cell porosity, based on the total volume of the respective wall).

10C. The coextruded article of any preceding C Exemplary Embodiment, wherein at least one of the first or second layers have a closed-cell porosity of at least 5 (in some embodiment, at least 10, 15, 20, 25, 30, 35, 40, 45, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective layer.

11C. The coextruded article of any preceding C Exemplary Embodiment, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall.

12C. The coextruded article of any preceding C Exemplary Embodiment, wherein all walls between the first and second layers are the first walls.

13C. The coextruded article of any preceding C Exemplary Embodiment further comprising a plurality of second walls.

14C. The coextruded article of Exemplary Embodiment 13C, wherein the second walls have a minimum width not greater than 400 (in some embodiment, not greater than 300, 200, or even not greater than 100; in some embodiments, in a range from 50 to 400, 50 to 300, 50 to 200, or even 50 to 100) micrometers.

15C. The coextruded article of either Exemplary Embodiment 13C or 14C, wherein there is an average minimum width for the second walls, and wherein the minimum width of an individual second wall is within ±10 (in some embodiments, ±20, ±30, ±40, or even ±50) for the second walls.

16C. The coextruded article of any of Exemplary Embodiments 13C to 15C, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls are essentially free of closed-cell porosity.

17C. The coextruded article of any of Exemplary Embodiments 13C to 16C, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall.

18C. The coextruded article of any of Exemplary Embodiments 13C to 17C, wherein all walls between the first and second layers are first and second walls.

19C. The coextruded article of any preceding C Exemplary Embodiment, wherein the microchannels have a length of at least 15 cm (in some embodiment, at least 20 cm, 25 cm, 30 cm, 50 cm, 1 m, 5 m, 10 m, 25 m, 50 m, or even at least 100 m).

20C. The coextruded article of any preceding C Exemplary Embodiment, wherein the first layer comprises a first thermoplastic material.

21C. The coextruded article of Exemplary Embodiment 20C, wherein the first thermoplastic material is at least one of polyolefins, ethylene vinyl acetate polymers, polyurethanes, or styrene block copolymers (e.g., styrene-isoprene-styrene block copolymers).

22C. The coextruded article of any preceding C Exemplary Embodiment, wherein the second layer comprises a thermoplastic material.

23C. The coextruded article of Exemplary Embodiment 22C, wherein the second thermoplastic material is at least one of polyolefins, ethylene vinyl acetate polymers, polyurethanes, or styrene block copolymers (e.g., styrene-isoprene-styrene block copolymers).

24C. The coextruded article of any preceding C Exemplary Embodiment, wherein the walls comprise a third thermoplastic material.

25C. The coextruded article of Exemplary Embodiment 24C, wherein the third thermoplastic material is at least one of polyolefins, ethylene vinyl acetate polymers, polyurethanes, or styrene block copolymers (e.g., styrene-isoprene-styrene block copolymers).

26C. The coextruded article of any preceding C Exemplary Embodiment, wherein the first layer comprises a first material, the second layer comprises a second material, and the walls comprise a third material, and wherein the third material is different from both the first and second materials.

27C. The coextruded article of any of Exemplary Embodiments 1C to 25C, wherein the first layer comprises a first material, the second layer comprises a second material, and the walls comprise a third material, and wherein at least two of the first material, the second material, or the third material are the same.

28C. The coextruded article of any Exemplary Embodiments 1C to 25C, wherein the first layer comprises a first material, the second layer comprises a second material, and the walls comprise a third material, and wherein the first material, the second material, and the third material are the same.

29C. The coextruded article of any preceding C Exemplary Embodiment, wherein the first major surface of the first layer has functional particles thereon.

30C. The coextruded article of any preceding C Exemplary Embodiment, the first layer has a thickness of at least 25 (in some embodiments, at least 50, 75, 100, 125, 150, 175, or even at least 200; in some embodiments, in a range from 25 to 300, 50 to 300, 75, to 300, 100 to 300, 150 to 300, 150 to 250, or even 200 to 250) micrometers.

31C. The coextruded article of any preceding C Exemplary Embodiment, the second layer has a thickness of at least 25 (in some embodiments, at least 50, 75, 100, 125, 150, 175, or even at least 200; in some embodiments, in a range from 25 to 300, 50 to 300, 75 to 300, 100 to 300, 150 to 300, 150 to 250, or even 200 to 250) micrometers.

32C. The coextruded article of any preceding C Exemplary Embodiment having has a thickness of at least 100 (in some embodiments, at least 200, 300, 400, 500, 600, or even at least 700; in some embodiments, in a range from 100 to 2500, 200 to 2500, 300 to 2500, 300 to 2000, 400 to 1500, or even 500 to 1000) micrometers.

1D. A method of making the coextruded article of any preceding C Exemplary Embodiment, the method comprising:
providing an extrusion die comprising a first cavity, a second cavity, a third cavity, and a first die slot, a second die slot, and a plurality of third die slots, wherein each die slot has a distal opening, wherein there is a fluid passageway between the first cavity and the first die slot, a fluid passageway between the second cavity and a second die slot, and a plurality of fluid passageways between the third cavity and the plurality of third die slots;
providing via extrusion a first material to the first cavity of the extrusion die, a second material to the second cavity of the extrusion die, and a third material to the third cavity of the extrusion die;
extruding the layers from the distal opening of the die slots; and forming together the extrusion melt from first and second die slot with the plurality of extrudate from the third die slots into one continuous coextruded article; and
quenching the extruded layer.

1E. A coextruded article comprising first and second layers each having first and second opposed major surfaces and between the first and second layers a series of first walls provide a series of microchannels, wherein there are at least 5 (in some embodiments, at least 10, 15, 20, 25, 30, 35, or even up to 40) first walls per cm, wherein each wall has a height extending from the first layer to the second layer, wherein each wall has an average width along its respective height, wherein no width of a wall exceeds more than ±20 (in some embodiments, not more than ±25, ±30, ±40, or even not more than ±50) percent of the average width for that wall, wherein there is an average width of the walls, and wherein no average width of a respective wall exceeds more than 5 (in some embodiments, not more than 10, 15, or even not more than 20) percent of the average width of the walls.

2E. The coextruded article of Exemplary Embodiment 1E, wherein for each wall there is a first average width along the first 2 percent of the height of the wall, wherein for each wall there is a second average width along the last 2 percent of the height of the wall, wherein for each wall there is a third average width along the remaining 96 percent of the height of the wall, and wherein for at least 50 (in some embodiments, at least 60, 70, 75, 80, 90, 95, or even 100) percent by number of the walls, the first average widths are less than the third average widths.

3E. The coextruded article of any preceding E Exemplary Embodiment, the second average widths are less than the third average widths.

4E. The coextruded article of any preceding E Exemplary Embodiment, wherein there is an average minimum width for the first walls, and wherein the minimum width of an individual first wall is within ±10 (in some embodiments, ±20, ±30, ±40, or even ±50) percent of the average minimum width for the first walls.

5E. The coextruded article of any preceding E Exemplary Embodiment, wherein the microchannels have a width not greater than 2000 (in some embodiment, not greater than 1500, 1000, 500, 200, or even not greater than 100; in some embodiments, in a range from 100 to 2000, 100 to 1000, 100 to 500, 200 to 500, 300 to 400, 200 to 500, or even 100 to 500) micrometers.

6E. The coextruded article of any preceding E Exemplary Embodiment, wherein the walls have a height (i.e., between the first and second layers) not greater than 3000 (in some embodiments, not greater than 200, 1500, 1000, 500, 250, or up to 100) in some embodiments, in a range from 50 to 3000, 50 to 2000, 100 to 2000, 100 to 1500, 200 to 1500, 200 to 1000, or even 300 to 500) micrometers.

7E. The coextruded article of any preceding E Exemplary Embodiment, wherein there are at least plurality of first walls having a width not greater than 400 (in some embodiment, not greater than 300, 200, or even not greater than 100;

in some embodiments, in a range from 50 to 400, 50 to 300, 50 to 200, or even 50 to 100) micrometers.

8E. The coextruded article of any preceding E Exemplary Embodiment, wherein at least one of the first or second layers are essentially free of closed-cell porosity (i.e., less than 5; in some embodiments, less than 4, 3, 2, or even less than 1) percent by volume closed-cell porosity based on the total volume of the respective layer) (in some embodiments, both the first or second layers are essentially free of closed-cell porosity).

9E. The coextruded article of any preceding E Exemplary Embodiment, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls are essentially free of closed-cell porosity (i.e., less than 5; in some embodiments, less than 4, 3, 2, or even less than 1) percent by volume closed-cell porosity, based on the total volume of the respective wall).

10E. The coextruded article of any preceding E Exemplary Embodiment, wherein at least one of the first or second layers have a closed-cell porosity of at least 5 (in some embodiment, at least 10, 15, 20, 25, 30, 35, 40, 45, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective layer.

11E. The coextruded article of any preceding E Exemplary Embodiment, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the first walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall.

12E. The coextruded article of any preceding E Exemplary Embodiment, wherein all walls between the first and second layers are the first walls.

13E. The coextruded article of any preceding E Exemplary Embodiment further comprising a plurality of second walls.

14E. The coextruded article of Exemplary Embodiment 13E, wherein the second walls have a minimum width not greater than 400 (in some embodiment, not greater than 300, 200, or even not greater than 100; in some embodiments, in a range from 50 to 400, 50 to 300, 50 to 200, or even 50 to 100) micrometers.

15E. The coextruded article of either Exemplary Embodiment 13E or 14E, wherein there is an average minimum width for the second walls, and wherein the minimum width of an individual second wall is within ±10 (in some embodiments, ±20, ±30, ±40, or even ±50) percent for the second walls.

16E. The coextruded article of any of Exemplary Embodiments 13E to 15E, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls are essentially free of closed-cell porosity.

17E. The coextruded article of any of Exemplary Embodiments 13E to 16E, wherein at least a portion (in some embodiments, at least 5, 10, 15, 20, 25, 30, 35, 40, 45, 50, 55, 60, 65, 70, 75, 80, 85, 90, 95, 96, 97, 98, 99, or even 100 percent by number) of the second walls have a closed-cell porosity of at least 5 (in some embodiment, at least 10, 15, 20, 25, 30, 35, 40, 45, 50, or even at least 50; in some embodiments, in a range from 5 to 90, 10 to 90, 25 to 90, 50 to 90, 60 to 90, 50 to 80, or even 60 to 80) percent by volume closed-cell porosity, based on the total volume of the respective wall.

18E. The coextruded article of any of Exemplary Embodiments 13E to 17E, wherein all walls between the first and second layers are first and second walls.

19E. The coextruded article of any preceding E Exemplary Embodiment, wherein the microchannels have a length of at least 15 cm (in some embodiment, at least 20 cm, 25 cm, 30 cm, 50 cm, 1 m, 5 m, 10 m, 25 m, 50 m, or even at least 100 m).

20E. The coextruded article of any preceding E Exemplary Embodiment, wherein the first layer comprises a first thermoplastic material.

21E. The coextruded article of Exemplary Embodiment 20E, wherein the first thermoplastic material is at least one of polyolefins, ethylene vinyl acetate polymers, polyurethanes, or styrene block copolymers (e.g., styrene-isoprene-styrene block copolymers).

22E. The coextruded article of any preceding E Exemplary Embodiment, wherein the second layer comprises a thermoplastic material.

23E. The coextruded article of Exemplary Embodiment 22E, wherein the second thermoplastic material is at least one of polyolefins, ethylene vinyl acetate polymers, polyurethanes, or styrene block copolymers (e.g., styrene-isoprene-styrene block copolymers).

24E. The coextruded article of any preceding E Exemplary Embodiment, wherein the walls comprises a third thermoplastic material.

25E. The coextruded article of Exemplary Embodiment 24E, wherein the third thermoplastic material is at least one of polyolefins, ethylene vinyl acetate polymers, polyurethanes, or styrene block copolymers (e.g., styrene-isoprene-styrene block copolymers).

26E. The coextruded article of any preceding E Exemplary Embodiment, wherein the first layer comprises a first material, the second layer comprises a second material, and the walls comprise a third material, and wherein the third material is different from both the first and second materials.

27E. The coextruded article of any of Exemplary Embodiments 1E to 25E, wherein the first layer comprises a first material, the second layer comprises a second material, and the walls comprise a third material, and wherein at least two of the first material, the second material, or the third material are the same.

28E. The coextruded article of any Exemplary Embodiments 1E to 25E, wherein the first layer comprises a first material, the second layer comprises a second material, and the walls comprise a third material, and wherein the first material, the second material, and the third material are the same.

29E. The coextruded article of any preceding E Exemplary Embodiment, wherein the first major surface of the first layer has functional particles thereon.

30E. The coextruded article of any preceding E Exemplary Embodiment, the first layer has a thickness of at least 25 (in some embodiments, at least 50, 75, 100, 125, 150, 175, or even at least 200; in some embodiments, in a range from 25 to 300, 50 to 300, 75 to 300, 100 to 300, 150 to 300, 150 to 250, or even 200 to 250) micrometers.

31E. The coextruded article of any preceding E Exemplary Embodiment, the second layer has a thickness of at least 25 (in some embodiments, at least 50, 75, 100, 125, 150, 175, or even at least 200; in some embodiments, in a range from 25 to 300, 50 to 300, 75 to 300, 100 to 300, 150 to 300, 150 to 250, or even 200 to 250) micrometers.

32E. The coextruded article of any preceding E Exemplary Embodiment having has a thickness of at least 100 (in some embodiments, at least 200, 300, 400, 500, 600, or even at least 700; in some embodiments, in a range from 100 to 2500, 200 to 2500, 300 to 2500, 300 to 2000, 400 to 1500, or even 500 to 1000) micrometers.

1F. A method of making the coextruded article of any preceding E Exemplary Embodiment, the method comprising:

provating an extrusion die comprising a first cavity, a second cavity, a third cavity, and a first die slot, a second die slot, and a plurality of third die slots, wherein each die slot has a distal opening, wherein there is a fluid passageway between the first cavity and the first die slot, a fluid passageway between the second cavity and a second die slot, and a plurality of fluid passageways between the third cavity and the plurality of third die slots;

providing via extrusion a first material to the first cavity of the extrusion die, a second material to the second cavity of the extrusion die, and a third material to the third cavity of the extrusion die;

extruding the layers from the distal opening of the die slots; and forming together the extrusion melt from first and second die slot with the plurality of extrudate from the third die slots into one continuous coextruded article; and quenching the extruded layer.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

Example

A co-extrusion die as generally depicted in FIG. 11 and assembled with a multi shim repeating pattern of extrusion orifices as generally illustrated in FIGS. 8 and 9 was prepared. The thickness of the shims in the repeat sequence was 4 mils (0.102 mm) for shims 600, and 700. The thickness of the shims in the repeat sequence was 2 mils (0.051 mm) for shims 500. These shims were formed from stainless steel, with perforations cut by a wire electron discharge machining. The shims were stacked in a repeating sequence 600, 600, 600, 500, 600, 600, 600, 500, 700, 700, 700, 500. This configuration creates a repeating length of 42 mils (1.067 mm) with cavities, passageways and orifices such that the first cavity feeds the orifice for the top layer, the second cavity feeds the orifice for the connecting walls, and the third cavity feeds the orifice for the bottom layer. The shims were assembled to create a die at about 8 cm in width. The extrusion orifices were aligned in a collinear, alternating arrangement, and resulting dispensing surface was as shown in FIG. 4.

Figure 12:
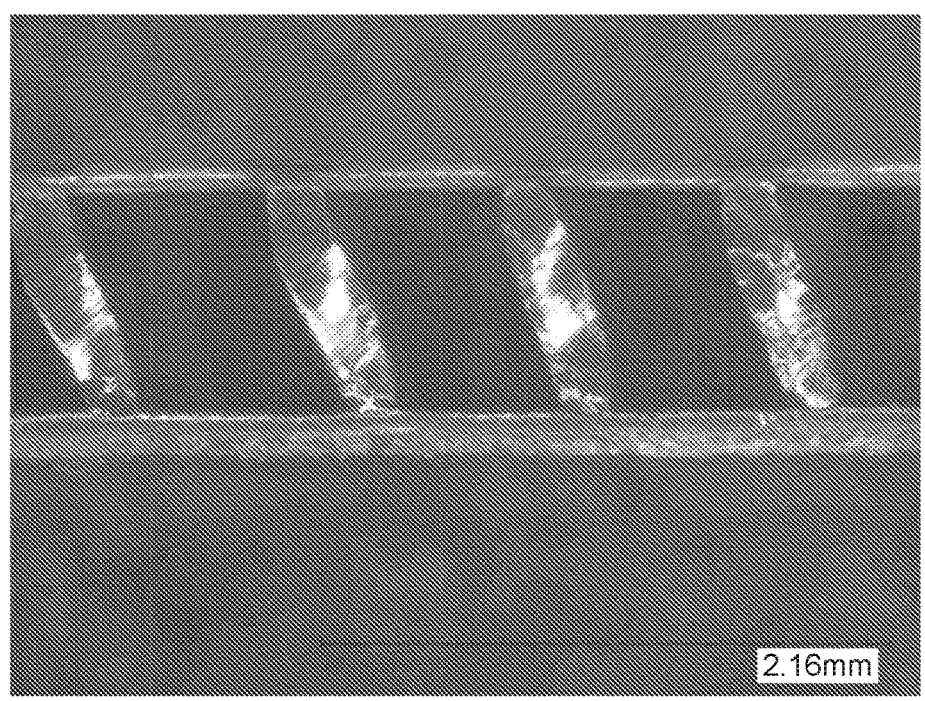
FIG. 12 is an optical image of the cross-section of Example 1.

The inlet fittings on the two end blocks were each connected to two conventional single-screw extruders. The top and bottom layer cavities of the die were fed with a single extruder loaded with polypropylene homopolymer (obtained under the trade designation "PP1024" from ExxonMobil, Irving, TX). The cavity feeding the cavity for the connecting walls was connected to an extruder loaded with polypropylene elastomer (obtained under the trade designation "VISTAMAXX 7810" from ExxonMobil, Irving, TX) dry blended with 2% red color concentrate (obtained under the trade designation "PP3TEX17690" from Clariant, Minneapolis, MN). Extruder flow rates were adjusted to achieve the channel web cross section shown in FIG. 12.

The melt was extruded at a slight angle from vertical into an extrusion quench takeaway. This slight angle enables the bonding of the top and bottom layers to the wall extruded features. The quench roll was a smooth temperature controlled chrome plated 20 cm diameter steel roll. The quench nip temperature was controlled with internal water flow. The web path wrapped 180 degrees around the chrome steel roll and then to a windup roll. Under these conditions a polymeric layer generally as depicted in FIGS. 1-3 was extruded.

Other process conditions are listed below:

| | |
|---|---|
| Extrusion temperature | 190° C. |
| Quench roll temperature | 10° C. |

An optical microscope was used to measure web dimensions in the crossweb:

| | |
|---|---|
| Top Layer Thickness: | 0.12 mm |
| Bottom Layer Thickness: | 0.16 mm |
| Total Caliper (Thickness): | 1.13 mm |
| Wall Width at the Top 2 %: | 0.16 mm |
| Wall Width at the Center: | 0.26 mm |
| Wall Width at the Bottom 2 Percent: | 0.18 mm |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A coextruded article comprising first and second layers each having first and second opposed major surfaces and between the first and second layers a series of first walls providing a series of microchannels, wherein there are at least 5 first walls per centimeter, wherein each wall has a height extending from the first layer to the second layer, wherein for each wall there is a first average width along the first 2 percent of the height of the wall, wherein for each wall there is a second average width along the last 2 percent of the height of the wall, wherein for each wall there is a third average width along the remaining 96 percent of the height of the wall, and wherein for at least 50 percent by number of the walls, the first average widths are less than the third average widths and the second average widths are less than the third average widths;

wherein the first 2 percent of the height of the wall extends from the first layer toward a middle of the wall, the last 2 percent of the height of the wall extends from the second layer toward a middle of the wall, and the remaining 96 percent of the height of the wall extends from the first 2% to the last 2% of the height of the wall.

2. The coextruded article of claim 1, wherein no width of a wall exceeds more than 20 percent of the average width for that wall, wherein there is an average width of the walls, and wherein no average width of a respective wall exceeds more than 5 percent of the average width of the walls.

3. The coextruded article of claim 1, wherein there is an average minimum width for the first walls, and wherein the minimum width of an individual first wall is within +10 percent of the average minimum width for the first walls.

4. The coextruded article of claim 1, wherein the first layer comprises a first material, the second layer comprises a second material, and the walls comprise a third material, and wherein the third material is different from both the first and second materials.

5. A method of making the coextruded article of claim 1, the method comprising:
provide an extrusion die comprising a first cavity, a second cavity, a third cavity, and a first die slot, a second die slot, and a plurality of third die slots, wherein each die slot has a distal opening, wherein there is a fluid passageway between the first cavity and the first die slot, a fluid passageway between the second cavity and a second die slot, and a plurality of fluid passageways between the third cavity and the plurality of third die slots;

providing via extrusion a first material to the first cavity of the extrusion die, a second material to the second cavity of the extrusion die, and a third material to the third cavity of the extrusion die;

extruding the layers from the distal opening of the die slots; and forming together the extrusion melt from first and second die slot with the plurality of extrudate from the third die slots into one continuous coextruded article; and quenching the extruded layer.

6. The coextruded article of claim 1, wherein there are demarcation lines between the walls and the first and second layers.

7. The coextruded article of claim 6, wherein no width of a wall exceeds more than +20 percent of the average width for that wall, wherein there is an average width of the walls, and wherein no average width of a respective wall exceeds more than 5 percent of the average width of the walls.

8. The coextruded article of claim 6, wherein there is an average minimum width for the first walls, and wherein the minimum width of an individual first wall is within +10 percent of the average minimum width for the first walls.

9. The coextruded article of claim 6, wherein the microchannels have a width not greater than 2000 micrometers.

10. A method of making the coextruded article of claim 6, the method comprising:
providing an extrusion die comprising a first cavity, a second cavity, a third cavity, and a first die slot, a second die slot, and a plurality of third die slots, wherein each die slot has a distal opening, wherein there is a fluid passageway between the first cavity and the first die slot, a fluid passageway between the second cavity and a second die slot, and a plurality of fluid passageways between the third cavity and the plurality of third die slots;

providing via extrusion a first material to the first cavity of the extrusion die, a second material to the second cavity of the extrusion die, and a third material to the third cavity of the extrusion die;

extruding the layers from the distal opening of the die slots; and forming together the extrusion melt from first and second die slot with the plurality of extrudate from the third die slots into one continuous coextruded article; and quenching the extruded layer.

* * * * *

UNITED STATES PATENT AND TRADEMARK OFFICE
CERTIFICATE OF CORRECTION

PATENT NO. : 11,945,149 B2
APPLICATION NO. : 17/247191
DATED : April 2, 2024
INVENTOR(S) : Ronald Wayne Ausen It is certified that error appears in the above-identified patent and that said Letters Patent is hereby corrected as shown below:

In the Claims

Column 25
Claim 5, Line 9, "a second die slot" should be changed to -- the second die slot, --

Column 26
Claim 10, Line 15, "a second die slot" should be changed to -- the second die slot --

Signed and Sealed this
Seventeenth Day of September, 2024

Katherine Kelly Vidal
*Director of the United States Patent and Trademark Office*